(12) United States Patent
Agarwal et al.

(10) Patent No.: US 6,509,910 B1
(45) Date of Patent: Jan. 21, 2003

(54) METHOD AND SYSTEM FOR INTERFACING WITH A DIGITAL MEDIA FRAME NETWORK

(75) Inventors: Naveen Agarwal, San Jose, CA (US); Victor Lee, Mountain View, CA (US); M. Krishna Bandaru, Sunnyvale, CA (US); Robert E. Siegel, Menlo Park, CA (US); Josh Mogal, Palo Alto, CA (US)

(73) Assignee: Eastman Kodak Company, Rochester, NY (US)

( * ) Notice: Subject to any disclaimer, the term of this patent is extended or adjusted under 35 U.S.C. 154(b) by 87 days.

(21) Appl. No.: 09/620,890

(22) Filed: Jul. 21, 2000

Related U.S. Application Data

(63) Continuation-in-part of application No. 09/405,523, filed on Sep. 23, 1999, now abandoned, which is a continuation-in-part of application No. 09/195,355, filed on Nov. 18, 1998, now abandoned.

(51) Int. Cl.[7] .............................................. G06F 13/00
(52) U.S. Cl. ...................................... 345/752; 345/744
(58) Field of Search ................................ 345/716, 723, 345/776, 810, 855, 854, 744, 797, 752

(56) References Cited

U.S. PATENT DOCUMENTS

| | | | |
|---|---|---|---|
| 4,651,255 A | 3/1987 | Yamanda | |
| 5,270,831 A | 12/1993 | Parulski et al. | |
| 5,410,415 A | 4/1995 | Parulski et al. | |
| 5,414,811 A | 5/1995 | Parulski et al. | |
| 5,448,372 A | 9/1995 | Axman et al. | |
| 5,633,726 A | 5/1997 | Timmermans | |
| 5,636,316 A | 6/1997 | Oku et al. | |
| 5,682,326 A | 10/1997 | Klingler et al. | |
| 5,706,290 A | 1/1998 | Shaw et al. | |
| 5,708,845 A | 1/1998 | Wistendahl et al. | |
| 5,930,471 A | 7/1999 | Milewski et al. | |
| 5,945,989 A * | 8/1999 | Freishtat et al. ............ | 345/797 |
| 5,966,122 A | 10/1999 | Itoh | |
| 5,973,682 A | 10/1999 | Saib et al. | |
| 5,982,364 A | 11/1999 | Beckwith | |
| 6,006,039 A | 12/1999 | Steinberg et al. | |
| 6,028,603 A * | 2/2000 | Wang et al. ................ | 345/776 |
| 6,035,323 A | 3/2000 | Narayen et al. | |
| 6,064,666 A | 5/2000 | Willner et al. | |
| 6,121,970 A | 9/2000 | Guealia | |

FOREIGN PATENT DOCUMENTS

| | | |
|---|---|---|
| EP | 0 471 639 A2 | 7/1991 |
| EP | 0 717 339 A2 | 6/1996 |
| EP | 0 766 431 A2 | 12/1996 |

OTHER PUBLICATIONS

"Doing Fieldwork in the High–Tech Jungle", Dean Takahaski, Wall Street journal, Oct. 27, 1998, 2 pp.
"Vision of the Future", Phillips Design, Eindhoven, The Netherlands, 1996, V=K Publishing, Blaricum, 1996, Third Edition, 1998, 4 pp.
"JPEG Image Viewer", Hagiwara Sys Com press release, Nov. 4, 1998, 2 pp.
PCT Application No. WO 99/39275, Aug. 5, 1999.
PCT International Publication No. WO 00/16541, Mar. 23, 2000.
Yahoo "Greetings" Internet Online, Jan. 2000—URL: http://ca.greetings.yahoo.com/greet/.
PCT International Publication No. WO 98/43184, Oct. 1, 1998.

* cited by examiner

*Primary Examiner*—Cao H. Nguyen
(74) *Attorney, Agent, or Firm*—Mark G. Bocchetti

(57) ABSTRACT

A method for sending data between multiple networks is disclosed. In one embodiment, a request for a service available in a second network is initiated by a member of a first network. The request is sent to the second network. The second network is coupled with the first network. The request comprises an identification and a password of the member defined in the second network, a request type and a network identification associated with the first network. The second network identifies the member in the second network using the identification and the password. The request is processed in the second network.

30 Claims, 17 Drawing Sheets

METHOD AND SYSTEM FOR INTERFACING WITH A DIGITAL MEDIA FRAME NETWORK

This application is a continuation-in-part of application Ser. No. 09/405,523 filed on Sep. 23, 1999, now abandoned which is a continuation-in-part of application Ser. No. 09/195,355, filed on Nov. 18, 1998 now abandoned.

FIELD OF THE INVENTION

The present invention relates generally to the field of network data distribution. More specifically, the present invention relates to sharing data in the network.

BACKGROUND OF THE INVENTION

With image representations evolving rapidly into a viable consumer electronic business, digital photography and objects are emerging to fill the needs of image representation. Images are commonly captured by digital cameras or digital scanners. A typical digital camera captures a picture and stores the captured pictorial information in a digital data format. Also, a conventional digital scanner scans pictures, such as, a color photographic film (e.g., 35 mm), and converts the scanned pictorial information into object data.

When an image is captured and the captured image data is generated, it is often difficult to display the captured image. One conventional approach is to use a personal computer ("PC") to display the images. In this approach, the image data is first transferred to the PC from an image capturing device, such as, a digital camera, and then the PC displays the image according to the image data received. A problem with this approach is that a regular PC may not be able to process the image data without additional software or hardware to reconfigure the PC.

Another commonly employed approach is to use an image-processing machine, such as, a workstation, a minicomputer, or a mainframe. Like the PC, the image data must first be transferred to the image-processing machine, and the image-processing machine, subsequently, displays the image after processing the image data. This approach posts similar problems as a PC that the image-processing machine has to be reconfigured before it is able to process the image data. Also, the image-processing machine is not typically mobile.

Accordingly, it is desirable to have a simple frame-like device that is capable of obtaining digital images and other digital objects, capable of displaying those digital images and objects, and capable of sharing those digital images and objects. As will be seen, one embodiment of the present invention provides a portable digital media frame (DMF) that allows objects to be shared across several networks.

SUMMARY OF THE INVENTION

A method for sending data between multiple networks is disclosed. In one embodiment, a request for a service available in a second network is initiated by a member of a first network. The request is sent to the second network. The second network is coupled with the first network. The request comprises an identification and a password of the member defined in the second network, a request type and a network identification associated with the first network. The second network identifies the member in the second network using the identification and the password. The request is processed in the second network.

Other features of the present invention will be apparent from the accompanying drawings and from the detailed description which follows.

BRIEF DESCRIPTION OF THE DRAWINGS

The present invention is illustrated by way of example and not limitation in the accompanying figures.

DETAILED DESCRIPTION

A digital media frame ("DMF") and method for sharing an object displayed on the DMF using a single share action is disclosed. In the following description numerous specific details are set forth in order to provide a thorough understanding of the present invention. It will be apparent, however, to one having ordinary skill in the art that the specific detail need not be employed to practice the present invention. In other instances, well known materials or methods have not been described in detail in order to avoid obscuring the present invention and minimal display hardware.

The DMF allows a user to display at least one object with minimal user intervention. The image is referred to as a photographic image or picture, a graphic image, a text image, a data image, or any other type of displayable information. The DMF is capable of receiving image and related data (e.g., audio, text, etc.) from various external input devices, such as, digital cameras, video cameras, computers, telephone lines, television cables, and Internet servers or other types of networks. Upon receipt of the image and related data, the DMF generates auxiliary information relating to each image and stores the image together with the auxiliary information in the memory. The DMF, subsequently, fetches the image and related data from the memory with the auxiliary information and displays the images on a display. The DMF may also play or make playable audio that is associated with these images. These images may be single frame or video or animation sequence.

Figure 1:
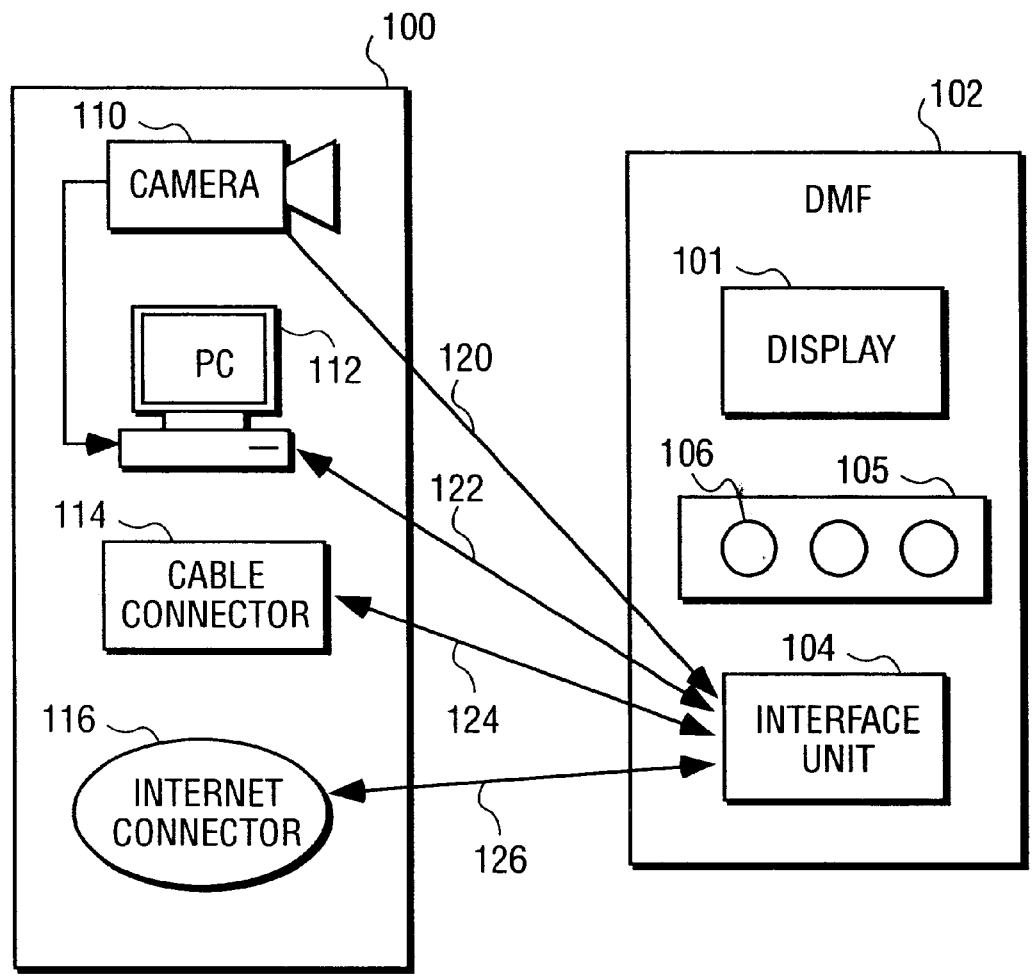
FIG. 1 illustrates a connection between Digital Media Frame ("DMF") and external input devices in accordance with an embodiment of the present invention.

FIG. 1 illustrates an embodiment of a connection between DMF and external input devices 100. The connection includes a DMF 102, a camera 110, a personal computer ("PC") 112, a cable connector 114, and an Internet connector 116. The DMF 102 further contains an interface unit 104 and a user input component 105. The user input component 105 also contains user-input buttons 106, which are the input devices. The interface unit 104 includes at least one I/O ("input and output") port capable of connecting to the camera 110, PC 112, the cable connectors 114, and the Internet connector 116 using connecting cables 120, 122, 124, and 126, respectively. The interface unit 104 is further capable of receiving and processing both digital and analog image data. It will be apparent to one of ordinary skill in the art that one or more of these external input devices may be connected to a particular DMF 102. It will also be apparent that the equivalent conventional input devices may be similarly connected. The digital camera may be a digital still camera or a digital video camera, and the video camera may be an analog video camera.

The camera 110 can either be a digital or a video camera. In one embodiment, the camera 110 can directly transfer the captured image to the DMF using conventional transmission media, such as, for example, wireless, cable, or removable media. In another embodiment, the camera 110 can first transfer the captured images and related data to a computer 112 and the computer 112, subsequently, transfers the image and related data to the DMF 102. The advantage of using a computer 112 as a forwarding station between the camera 110 and the DMF 102 is to perform some functions which the DMF 102 may be unable to perform, such as data conversion.

The computer 112, which may be a PC, a workstation, a mini-computer, or a mainframe computer, or a processor based system, receives image data from other devices, such as, scanners, Internet servers, or cameras 110. Upon receipt of the image and related data, the computer 112 may perform some functions before the computer 112 passes the image and related data to the DMF 102. The function may involve, for example, reordering the sequence of the images to be displayed, or converting one type of image data format to another type of image data format, editing a video, adding audio annotations, and so on.

The cable connectors 114 include television and telephone lines. The lines could be optical, metal, or cordless media. In one embodiment, the interface unit 104 is capable of receiving the image and related data directly from the cable connectors 114. In another embodiment, the interface unit 104 receives the image and related data from a forwarding station, such as a computer 112, where the cable 114 is connected to the computer 112.

The Internet connector 116 is another external input device 100 that enables the DMF 102 to receive the image and related data directly from an Internet node. In one embodiment, the DMF 102 is configured to be able to communicate via HyperText Transfer Protocol ("HTTP") and to interface with Transmission Control Protocol ("TCP")/ Internet protocol ("IP"). It should be noted that the connecting cables, 120, 122, 124, and 126 can use conventional optical, electrical, or wireless data communication technology.

Figure 2:
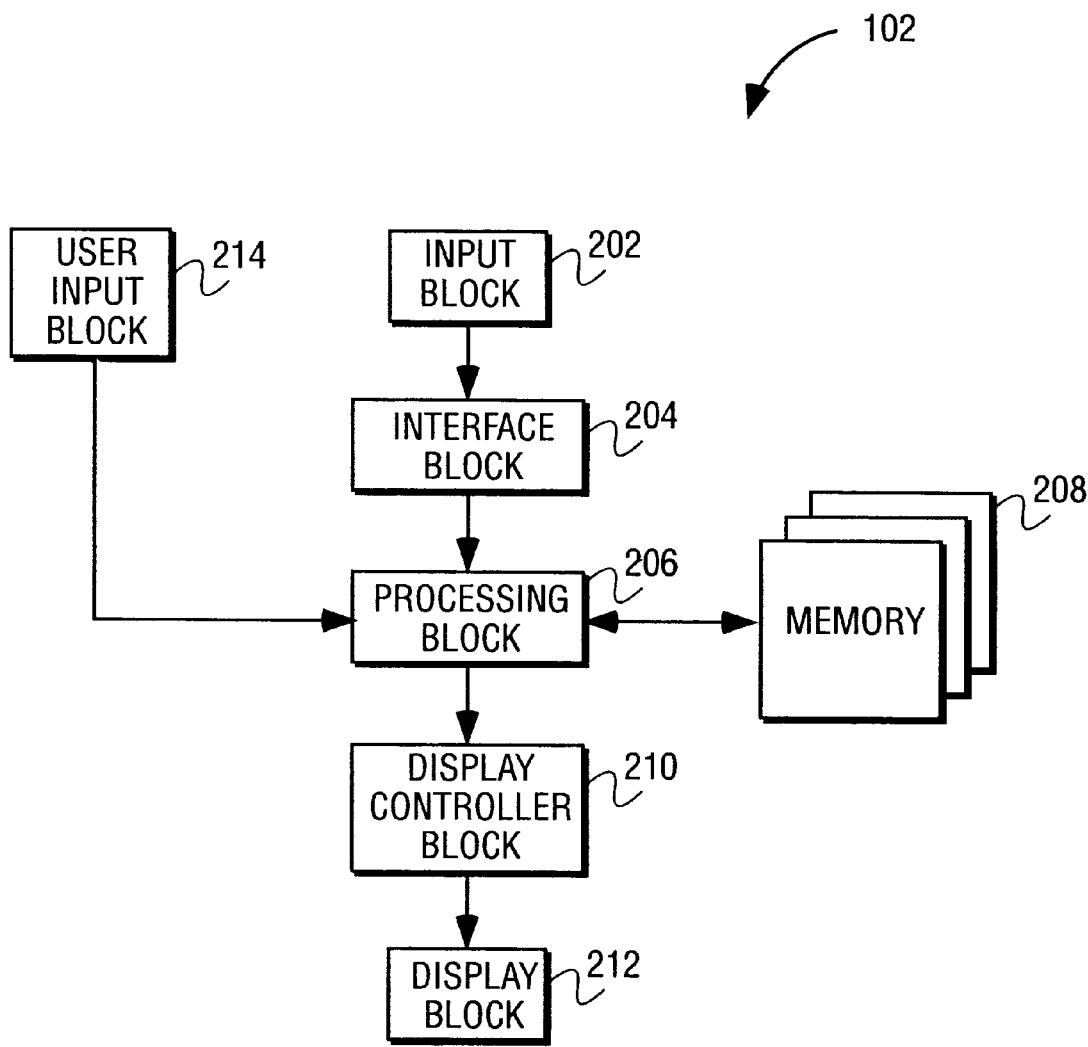
FIG. 2 illustrates a block diagram of DMF in accordance with an embodiment of the present invention.

FIG. 2 illustrates a block diagram of DMF 102. Block 202 represents external input devices 100, which include digital and video cameras, scanners, computers, and Internet servers. Digital and video cameras include digital video cameras, digital still cameras, analog video cameras, and so on. Upon capturing image data, the external input devices transfer captured image data to the interface block 204. Block 204 represents an interface unit of the DMF 102, where the interface unit 104 receives the image data from block 202. After receiving the image data, the interface unit identifies the type of protocol or data format being used to transfer the image data and further determines whether a conversion may be required. A conversion to a native DMF data format is needed if the DMF is unable to identify and to process originally received data format for image or image sequence data. Once the image or image sequence data format is properly identified, the image and related data is passed from block 204 to block 206 for processing.

Block 206 represents processor(s) or micro-controller(s), which is a processing unit for the DMF 102. Block 206 determines where the image and related data is to be stored and which sequence of the images is to be displayed. Block 206 also generates auxiliary information for each image, where the auxiliary information includes a color assignment, date and time of the image data created and received, Internet address, image orientations, and so on. The color assignment maps out image color distribution from an available color grid according to the color distribution of the image data. The date and time of the image data created and received indicates the date and time that each image or image sequence was created and the date and time that the image or image sequence was received by the DMF 102. The Internet address indicates which Internet node was used for sending the image and related data to the DMF 102. In one embodiment, the Internet address links to other web sites that are related to the image or image sequence. For example, if an image describes a child, the linked web sites describe child's family. Audio information includes both the original sound that came with the image data and edited sound created by users. Moreover, block 206 also receives control signals from block 214.

Block 214 represents a user-input unit. In one embodiment, block 214 gives a user certain controls to manage how images should be displayed. Block 214 can be any conventional input device, such as, a push button, a screen input device, remote control input device, or a sound activated input device (including speech recognition input-output device). The output(s) of block 214, which is a control signal from a user to indicate how images should be displayed, is fed onto block 206, where block 206 uses the output(s) of block 214 as an input(s) for determining how to display images. Block 206 also receives inputs from block 208.

Block 208 represents a memory block, (or set of memory blocks) which may include, for example, one or more of the following: dynamic random access memory ("DRAM"), static random access memory ("SRAM"), read-only memory, ("ROM"), non-volatile memory, removable non-volatile memory (e.g., flash cards, etc.), magnetic disk storage, magnetic tape storage, CD-ROM, DVD-ROM, and so on. In one embodiment, block 206 controls the access of block 208. It should be noted that block 208 may also receive data from other blocks, such as block 204 and block 210.

After block 206, the image and related data is transferred from block 206 to block 210, where the image and related data is prepared for displaying. Block 210 represents a display controller. In one embodiment, block 210 is capable of controlling various types of display devices, such as, for example, a liquid crystal display ("LCD"), a cathode-ray tube ("CRT"), an organic light-emitting display ("OLED"), a light-emitting polymer ("LEP") display, a plasma display, or a silicon-based display. Block 210 processes the image data by converting the image data display codes to a format compatible with particular display hardware. Block 210 may also contain a memory to store the display codes. After conversion, block 210 transfers the display codes along with display controls to block 212.

Block 212 represents a display device, which may be a LCD, a CRT, an OLED, a LIP display, a plasma display, or a silicon-based display, or an image projector. After receipt of the display codes, block 212 displays images. It should be noted that blocks 210 and 212 can receive input signals from other blocks, such as block 214 could have direct input signals to block 210.

Moreover, there is a power block (not shown in the figure) that includes both AC and DC power supplies. In one embodiment, the DC battery backup power supply is employed for preventing memory loss upon AC power supply disconnection.

Figure 3:
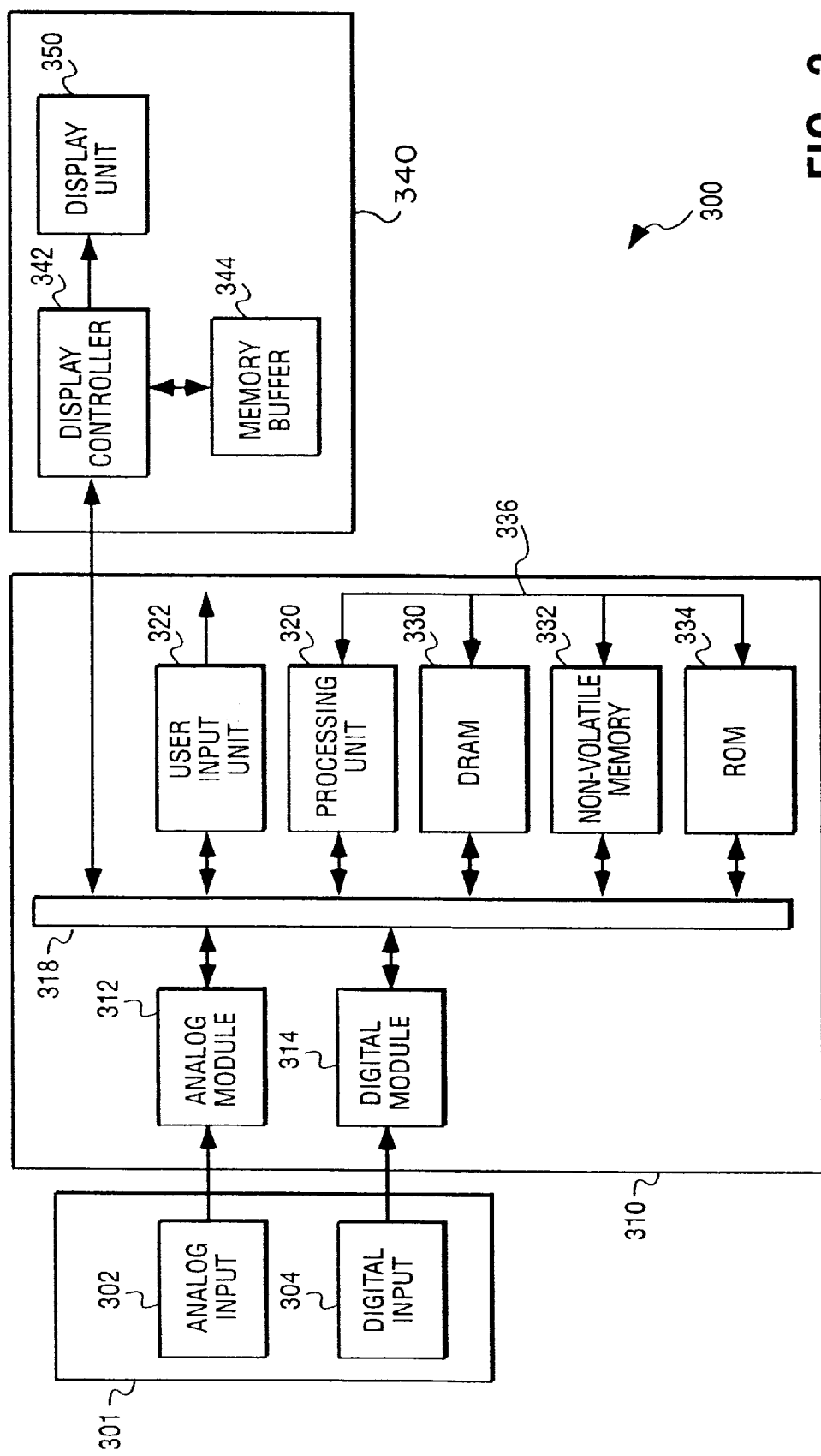
FIG. 3 illustrates a block diagram of DMF in accordance with an embodiment of the present invention.

FIG. 3 illustrates an embodiment of DMF architecture 300, which includes an image input block 301, image processing block 310, and image displaying block 340. The image-input block 301 captures images and related data and transfers the captured image data to the image-processing block 310. The image-processing block 310 identifies types of image data and stores the identified image data. The image-processing block 310 further attaches auxiliary information to each image and then transfers the image data to the image-displaying block 340. The image displaying block 340 displays images according to the image data received.

The image-input block 301 contains an analog input unit 302 and a digital input unit 304. The analog input unit 302 is an analog input device, such as a video camera, and is capable of generating analog image data according to captured images. Upon generation of the analog image data, the analog input unit 302 transfers the analog image data to the image-processing block 310. The digital input unit 304 is a digital input device, such as a digital camera, and is capable of generating object data according to captured analog images. After properly generating the object data, the digital input unit 304 transfers the object data to the image-processing block 310.

The image processing block 310 contains an analog module 312, a digital module 314, a processing block 320, a user input unit 322, a dynamic random access memory ("DRAM") 330, an non-volatile memory unit 332, a read only memory ("ROM") 334, and an internal bus 318. The analog module 312 includes an analog receiver circuit and a synchronizing circuit.

The analog receiver circuit receives analog image data from the image-input block 301. After receiving the analog image data, the synchronizing circuit performs analog to digital conversion and subsequently synchronizes the converted image data to generate image data. After the data is received and synchronized, the analog module 312 drives the object data on the internal bus 318.

In one embodiment, the digital module 314 includes a digital receiver circuit and a translation circuit (not shown in the figure). In one embodiment, the digital receiver circuit receives digital image data from the image-input block 301. For example, the digital image data may be provided by flash card inserted through an interface (not shown) in the image-input block 301. Upon receipt of the object data, the translation circuit determines whether a translation of the image data is needed. A translation is required if the data format of the input image data is a foreign data format. The foreign data format is a type of data format or protocol that the DMF is unable to implement. In one embodiment, the DMF has multiple native data formats, and is also capable of recognizing multiple foreign data formats.

Consequently, the foreign data format of the image data must be converted to a native data format before the image data can be implemented for display. After the image data is properly received and translated, the digital module 314 drives the object data on the internal bus 318.

The internal bus 318 connects to the processing unit 320, DRAM 330, non-volatile memory 332, ROM 334, the analog module 312, and the digital module 314. In one embodiment, the processing unit 320 is used to control the internal bus 318, such as issuing bus busy and bus grant signals. It should be noted that other types of bus connections and bus controls are possible.

The processing unit 320, in one embodiment, connects to the internal bus 318, the user input unit 322, DRAM 330, non-volatile memory 332, and ROM 334. The processing unit 320 performs functions including image size scaling, color space conversion, image filtering, image decoding, image data compression/decompression, and so on. In another embodiment, a processor in the processing unit 320 is configured to determine a sequence of images to be displayed. The processor also controls variable time interval or time transition types between images. The interval transition time indicates the time interval between the current image and the next image to be displayed. The image transition is a mechanism of retiring current image while phasing in the next image. In one embodiment, the image transition moves current and next images in one direction as the current image move out while the next image moves in.

In another embodiment, the processing unit 320 maps out image colors from available color grid according to color attributions of the image data. The processing unit 320 further generates auxiliary information for each image, where the auxiliary information may contain a color assignment, date and time of the image data generated and received, Internet addresses, audio information, image orientations, and so on.

In yet another embodiment, the processing unit 320 is capable of receiving a predetermined sequence of images to be displayed from an external input device 100, such as a computer. Moreover, a sequence of images to be displayed may be altered by control signals from a user, such as a pause signal from the user-input unit 322. The processing unit 320 further manages a low power management circuit to conserve power consumption upon disconnection of AC power supply.

The processing unit 320 is further configured to control the memory access. The memory devices includes DRAM 330, non-volatile memory 332, ROM 334, magnetic disk storage, magnetic tape storage, and so on. In one embodiment, the non-volatile memory 332 is a flash memory and is used to prevent memory loss upon disconnection of power supplies. The processing unit 320 controls the memory access using control bus 336, which carries various control signals. In another embodiment, the processing unit 320 controls the memory access using the internal bus 318 for issuing control signals, such as bus grant and bus busy signals.

In one embodiment, the sequence of the images to be displayed is a function of where the image data is to be stored in the memory. In this embodiment, the image display block 340 fetches the next image data from a predefined physical memory location. In another embodiment, a sequence of the images to be displayed can be reordered by the processing unit 320. In yet another embodiment, the sequence can be further altered by a user using the user-input unit 322.

In one embodiment, the processing unit 320 controls the internal bus 318 and the control bus 336. While the control bus 336 is used for control signals, the internal bus 318 is used for data. It should be noted that the internal bus 318 and the control bus 336 can be merged into one single bus.

In another embodiment, the internal bus 318 contains a bus controller to control the bus access.

The user input unit 322 is an input device, such as a push button switch, a touch screen input device, remote control device, or a sound activated input device (speech recognition input-output device), and so on.

In one embodiment, the user-input unit 322 provides display controls to users, such as a fast forward, a reverse, and pause functions. The fast forward function allows a user to view the next image, while the reverse function allows a user to view the previous image.

When the image data is properly identified and ordered, the processing unit 320 drives the image data together with the auxiliary information on the internal bus 318. In one embodiment, the processing unit 320 uses a private bus (not shown in the figure) between the processing unit 320 and the display controller 342 for transferring the image data. Upon receipt of the image data, the image display block 340 prepares to display the images in response to the image data and the auxiliary information.

The image display block 340 contains a display unit 350, a display controller 342, and a memory buffer 344. In one embodiment, the display unit 350 is a LCD. In another embodiment, the display unit 350 is a CRT. In yet another embodiment, the display unit 350 is a silicon-based display.

After receiving the image and related data, the display controller 342 generates the image display code in response to the image data and the auxiliary information. The display unit 350, subsequently, receives display codes for images from the display controller 342 and displays the image. In one embodiment, the display controller 342 stores a set of display code in the memory buffer 344. In another embodiment, the display controller 342 stores the display code in the non-volatile memory 332 or DRAM 330.

It should be noted that the display controller 342 could be integrated into the display unit 350 or be integrated into the processing unit 320. Also, the image processing block 310 and image display block 340 may be integrated in a single integrated circuit ("IC").

Figure 4:
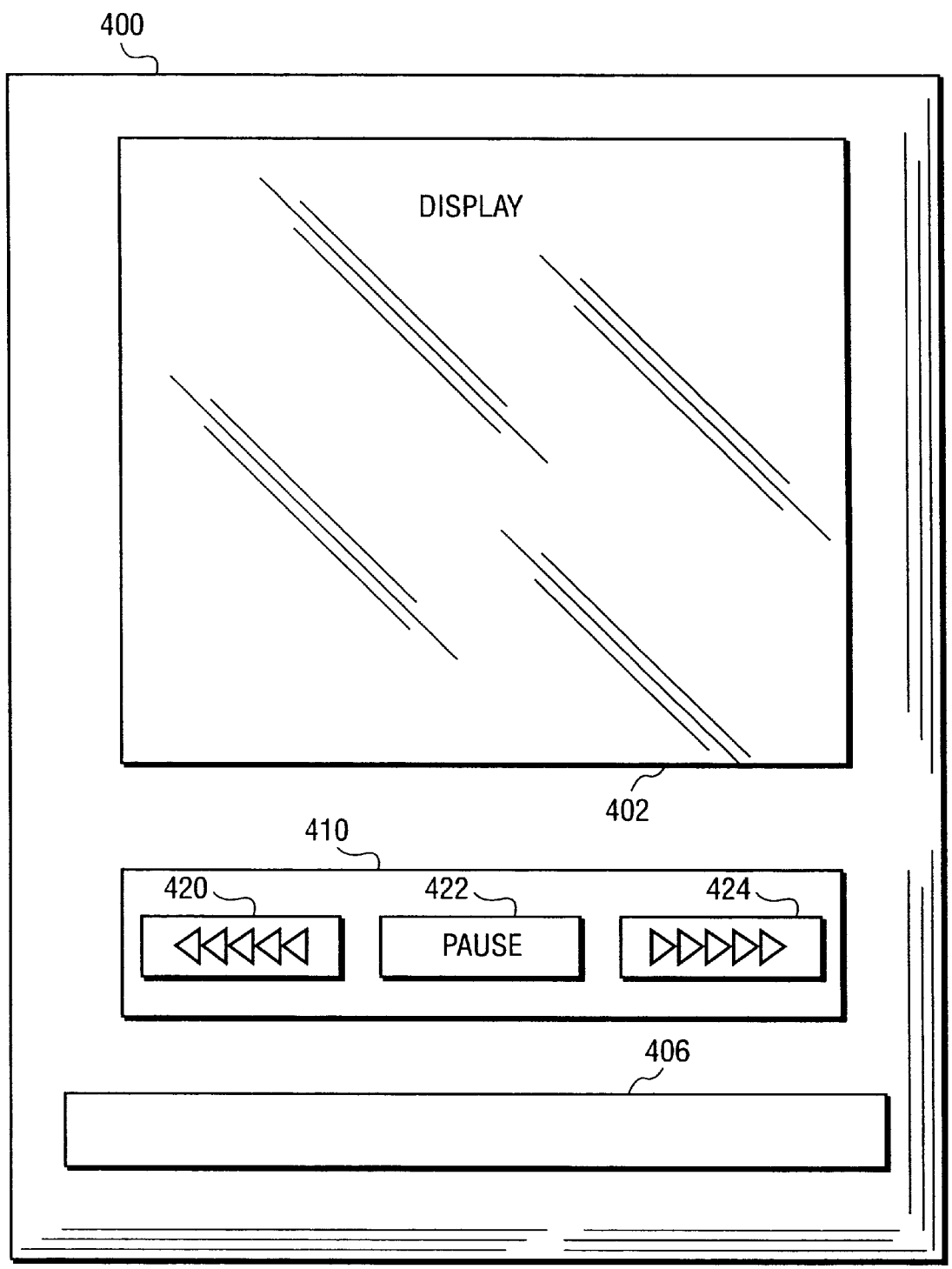
FIG. 4 illustrates a DMF having a display, a processing unit, and a user input device in accordance with an embodiment of the present invention.

Referring to FIG. 4, an embodiment of the DMF 400 is illustrated. The DMF 400 contains a display 402, a user input device 410, and a processing unit 406. The display 402 displays images according to the image data received. The processing unit 406 performs image-processing functions as described in above. The user-input device 410 is an input device that allows a user to change images and related data that are currently displaying.

The user-input device 410 may contain a reverse button 420, a pause button 422, and a forward button 424. The reverse button 420 allows a user to view previously displayed images, while the forward button 424 allows a user to view next sequential images. The pause button 422 causes a currently displaying image to freeze until a release command is issued by a subsequent activation of the pause button 422. In another embodiment, the user-input device 410 does not include the pause button 422 and the image is displayed for a predetermined time period set by the user before a next image is displayed. This predetermined time period can be set in the DMF or in the network server.

In another embodiment, the user-input device 410 may include a button to confirm a selection such as, for example, an "ok" button. It should be noted that the input device may comprise of other logic to implement similar functions as provided by the buttons described above without departing from the scope of the invention. For example, instead of the button, a toggle switch may be used.

In another embodiment, the user-input device 410 may be merged with the display 402, where inputs can be made through a conventional touch screen input device. In yet another embodiment, the inputs can be made through a conventional voice activated input device, such as a speech recognition input/output device. In yet another embodiment, the inputs come from a computer using conventional port connections.

Figure 5:
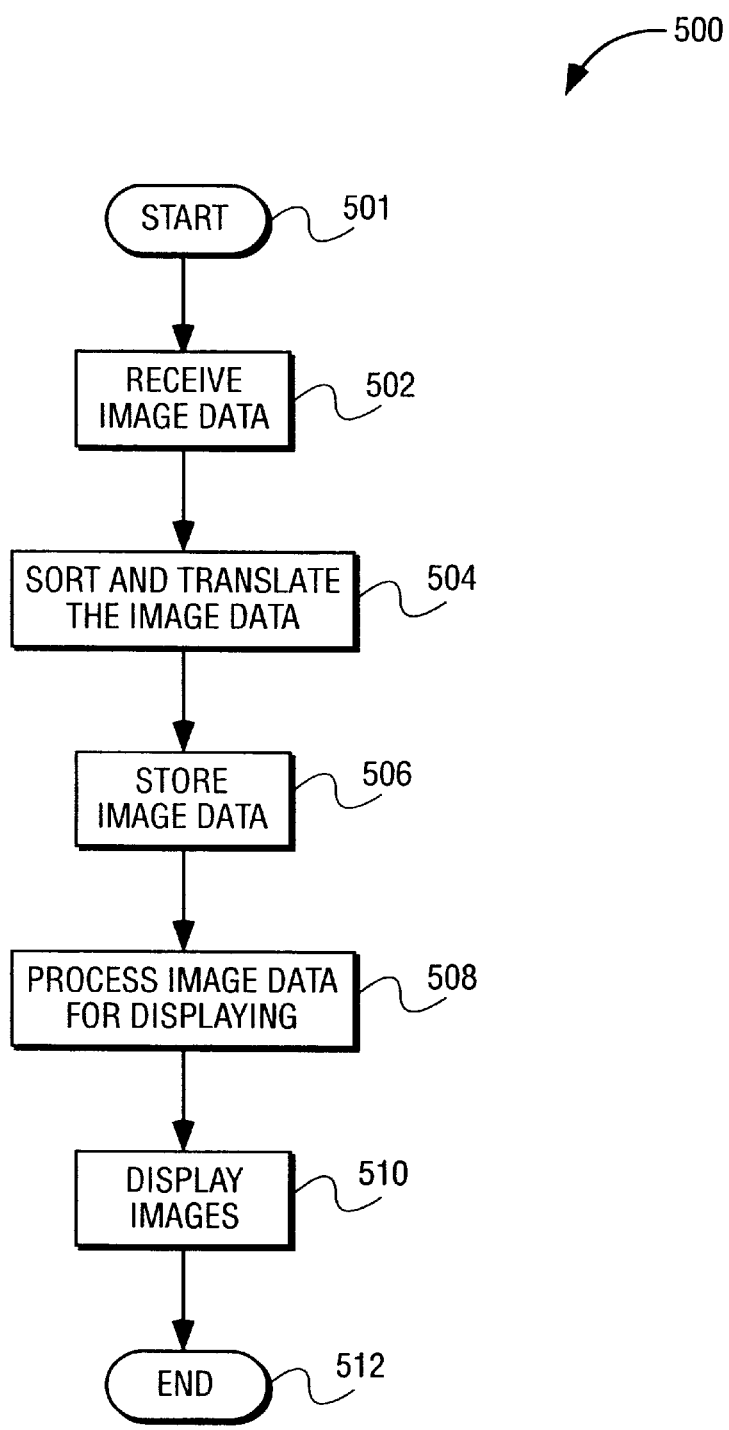
FIG. 5 is a flow chart illustrating a data flow of DMF in accordance with an embodiment of the present invention.

FIG. 5 is a flow chart illustrating a data flow within the DMF 400. A process of image displaying starts at block 501. The process proceeds to block 502, where an interface unit of the DMF 400 receives the image data. The image data may be captured by image capturing devices, such as a digital or video camera. Upon receipt of the image data, the interface unit 301 identifies whether the image data is in a digital data format or in an analog data format. If the image data is in the analog data format, the interface unit will convert the analog data format to a digital data format. If the image data is in the digital data format, no conversion from analog to digital ("A/D") is needed.

After block 502, the process proceeds to block 504, where the image data is sorted in a predefined sequence or a special ordered sequence of images. Before moving on to the next block, the process determines whether a translation is required. A translation is needed if the DMF 400 identifies that the data format of the image data is a foreign data format. Consequently, the foreign data format must be translated into a DMF native data format before the image data can be further processed. After the image data is properly sorted and translated, the process proceeds to the next block.

The process moves from block 504 to block 506, where the image and related data is stored in the memory. In one embodiment, the location of the image data stored determines the sequence of the images to be displayed. After block 506, the process proceeds to block 508, where the image data is converted to display codes. In one embodiment, block 508 determines the interval transition time and the various types of image transitions. The interval transition time indicates the time interval between the current image and the next image to be displayed. The image transition is a mechanism of retiring current images from the display while phasing in the next image. In one embodiment, the image transition moves current and next images in one direction as the current image moves out while the next image moves in. In another embodiment, the image transition fades out the current image while fading in the next image. After block 508, the process proceeds to block 510, where images are displayed according the image data together with the auxiliary information. The process ends at block 512.

Figure 6:
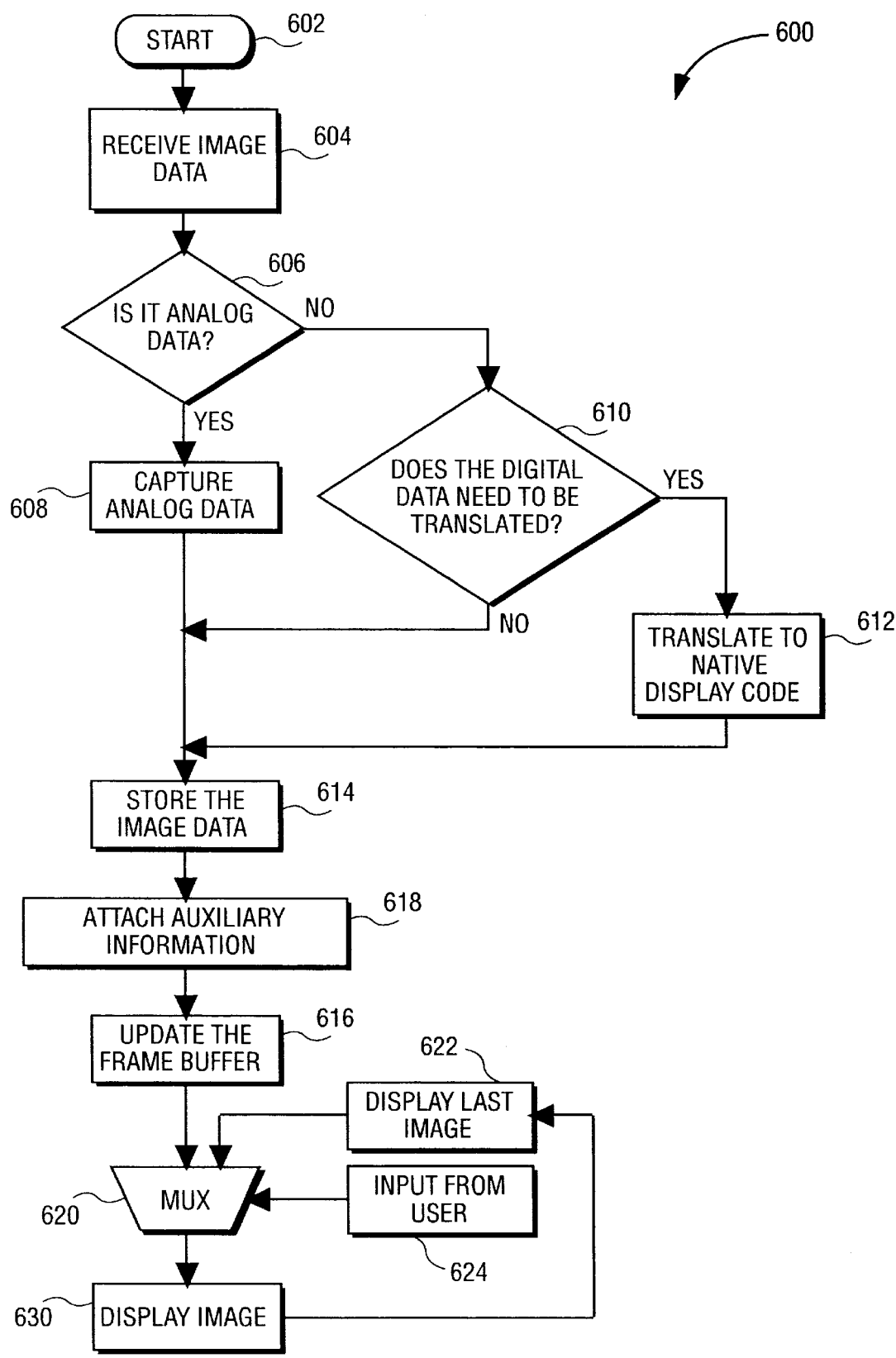
FIG. 6 is a flow chart illustrating a data control of DMF in accordance with an embodiment of the present invention.

FIG. 6 is a flow chart illustrating an embodiment of a controlled data flow of DMF 600. A process of image display starts at block 602. The process moves from block 602 to block 604, where an interface unit of the DMF receives the image data, which may be captured by image capturing devices, such as digital or video cameras. Upon receipt of the image data, the process proceeds to block 606, where the process identifies whether the image data is in analog or digital data format. If the image data is in analog data format, the process proceeds from block 606 to block 608. At block 608, the process converts the analog data format into digital data format. After conversion, the process proceeds from the block 608 to block 614, where the image data is stored.

If the image data is not in analog data format, which indicates that the image data is in digital data format, the process proceeds from block 606 to block 610. At block 610, the process identifies whether the object data needs to be translated into a DMF recognizable digital data format. If the digital data format of the image data is recognizable, the process proceeds from block 610 to block 614.

If the image data is a foreign data format, the process moves from block 610 to block 612, where a translation is performed. For example, when the native data format is JPEG and the image data is in a foreign data format (e.g., GIF, TIFF, BMP, PICT, PCX, etc.), the translation from the foreign data format to JPEG is performed. At block 612, the foreign data format of input image data is translated into a DMF native data format. In one embodiment, the DMF may have several native data formats, which will reduce the frequency of translation. In another embodiment, the DMF is capable of identifying multiple foreign data formats. After translation, the process proceeds from block 612 to block 614, where the image and related data are stored.

In one embodiment, the image and related data are stored in a non-volatile memory device, such as, for example, a flash memory, for preventing data loss upon disconnection of power supply. In another embodiment, a portable battery power supply is used to prevent data loss upon disconnection of power supply. In yet another embodiment, the image and related data are stored in a magnetic storage, such as a magnetic storage medium, such as, for example, magnetic disk storage or magnetic tape storage, for preventing memory loss. After block 614, the process moves to block 618, where the auxiliary data is attached to each image.

At block 618, the process aligns images and attaches the auxiliary information to each image. In one embodiment, the alignment of images can be sequential according to the order of the memory location that the image data stored. In another embodiment, the alignment of images is predefined. The auxiliary information may contain information such as, for example, color assignment, date and time of the image generated, information of Internet addresses, audio, image orientations, location of the on-line version of the image, and so on.

After attaching the auxiliary information, the process proceeds from block 618 to block 616, where the image data together with the auxiliary information are stored in a memory buffer. The memory buffer is a small and fast memory device that provides fast memory access for displaying the images and related data. In one embodiment, the memory buffer is nonvolatile memory device to prevent memory loss upon power disconnection. In another embodiment, the memory buffer is regular random access memory having a backup portable power supply to prevent memory loss.

After block 616, the process moves to block 620, where the output from the memory buffer can be selected for displaying.

At block 620, the process further receives signals from block 624 and block 622. The block 624 contains input control signals from the user, while the block 622 contains the image data for the last displayed images. The process at block 624 receives a user input, which may indicate to pause the current image. In another embodiment, the user input is used as one of many combinational logic inputs for selecting the next image.

Upon selecting the image data, the process proceeds from block 620 to block 630, where the image is displayed. When the current image is displayed, the process proceeds from block 630 to block 622, where the current image is stored. In one embodiment, block 622 stores the image data only for one image, which is the last displayed image. In another embodiment, block 622 stores the image data for a set of recently displayed images.

In one embodiment, DMF has a pictorial mode and an information mode. While the pictorial mode of DMF displays a sequence of predefined pictures, graphics and related data. The information mode of DMF displays a set of information or data, such as, for example, news, financial data, advertising, etc. A third mode, of a combination of pictorial and informational modes may be formed where the DMF dedicates a portion of the screen to pictorial display while another portion of the screen is apportioned to informational display. It should be noted that other types of display modes may exist, but they are not important to understand the invention.

As discussed previously, DMF is capable of sending and receiving information over a network, such as the Internet. Various categories of information that are available over the Internet are also available to DMF. Accordingly, DMF, in one embodiment, can display several categories of information when it is in the information mode. For example, such categories can include news, sports, entertainment, financial data, et cetera. However, in order to display multiple categories of information in the information mode, DMF has to be set up or configured to handle multiple sets of information. In one embodiment, the information mode of DMF is configured through a DMF server, as will be described in more detail below.

Figure 7:
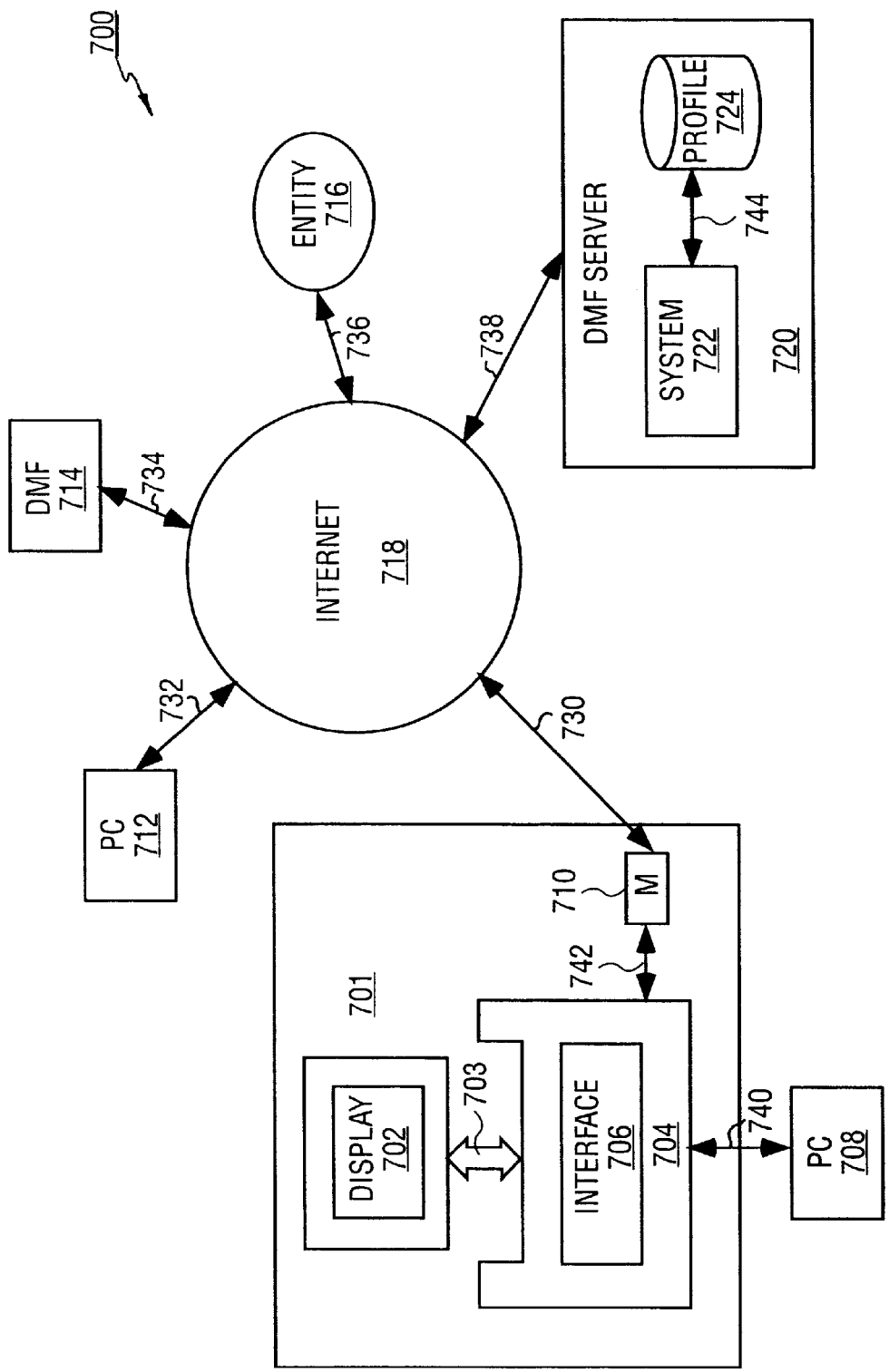
FIG. 7 illustrates one embodiment of a network configuration involving DMF.

FIG. 7 illustrates one embodiment of a network configuration 700. Configuration 700 contains a DMF 701, a PC 712, a PC 708, a DMF 714, an entity 716, a DMF server 720, and the Internet 718. Various conventional connecting cables, such as, cables 730-738, are used to provide device communications through the Internet 718. For example, the cable 730 may be a telephone line. DMF 701 further contains a display 702, a base 704, and a network-communicating device 710. Display 702 and base 704 are connected using a connecting device 703. In one embodiment, connecting device 703 is a cable. In another embodiment, connecting device 703 is a conventional cordless connecting device. Moreover, base 704 contains an interface circuit 706, which is used to receive and to send information to other devices.

Network-communicating device 710 may be a modem or a cordless modem, such as a cellular modem. In one embodiment, network-communicating device 710 is a one-way transmitting device, such as, for example, some type of paging communication device. In another embodiment, network-communicating device 710 is a two-way communicating device, which may facilitate an interactive communication between devices. In one embodiment, DMF 701 uses a cellular modem to communicate with PC 712, DMF 714, and entity 716 or DMF server 720.

PC 712 is, for example, a personal computer and it can communicate with DMF 701 via the Internet 718. DMF 714 is another digital media frame that is capable of communicating directly to DMF 701 via the Internet 718.

For instance, DMF 714 may use the Internet 718 as a network vehicle to deliver a set of images to DMF 701. Moreover, entity 716 can be a corporation or a group of devices, which may include multiple DMFs and PCs. In one embodiment, DMF 701 is capable of accessing to any device that is connected to the network.

DMF server 720 is a network server that provides DMF network service for DMF devices connected to the network. In one embodiment, DMF server includes a system 722 and a user profile database 724. DMF network service provides user and data services, which can be used to configure DMF. In one embodiment, the DMF network service supplies a DMF web page. Using the DMF web page allows users to select or customize the services received by the DMF from the DMF network services. In this embodiment, the DMF web page lists multiple categories of images the user can subscribe to. Alternatively, the DMF web page may list multiple commercially available content categories and the user can select the listed contents to view on the DMF. Commercially available contents can be retrieved from commercial web sites that provides information such as, for example, stock market news, sports, and weather channels. After the user completes the selection, the DMF network service creates a user profile and stores the selected categories in the user profile. The user profile can later be used as a default configuration for the corresponding DMF.

The DMF network service, in one embodiment, is responsible to maintain the user profile database 724. In this embodiment, the user profile database 724 is resided on DMF server 720. It should be noted that the user profile database 724 could be located on any other network server as long as the DMF network service can access the network serve through the network. The user profile database 724 can be modified either using DMF 710, PC 712, or other devices, which can directly access the DMF server web site. A user can also call a DMF network service provider to verbally convey to a DMF network service representative a new user DMF configuration. More detailed description about accessing the DMF network service will be described later.

Other methods of configuring DMF are possible. For example, DMF 701 could be configured by PC 708 or PC 712. Also, DMF 701 may contain configuration software, which allows DMF 701 to configure itself. It should be noted that other methods for configuring DMF 701 are possible, but they are not necessary to understanding the invention.

Figure 8:
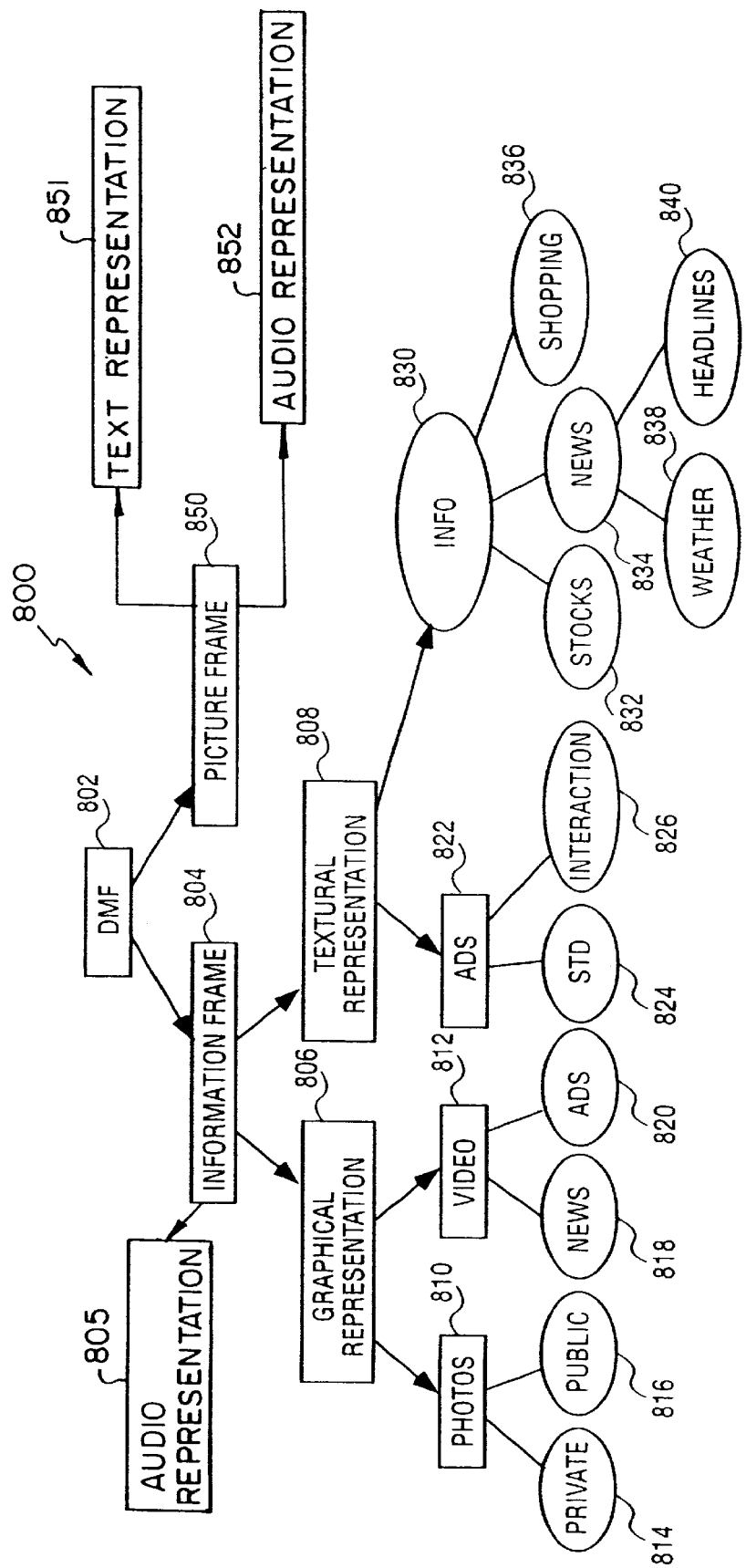
FIG. 8 illustrates an embodiment of architecture of DMF.

FIG. 8 illustrates an embodiment of a DMF architecture 800. DMF 802 includes an information mode 804 and a picture mode 850. Information mode 804 displays informational data, such as stock trading news. Picture mode 850 displays a sequence of pictorial images and related data that are previously received and stored in the memory.

Information mode 804 further contains a graphical representation portion 806 and a textural representation portion 808. Graphical representation portion 806 displays pictorial images while textural representation portion 808 displays text or letters. Graphical representation portion 806 can be further split into photos portion 810 and video portion 812. The photo portion 810 includes still pictorial images and video portion 812 contains motion images. Photo portion 810 can be further divided into private block 814 and public block 816. Private block 814 refers to individual photos, for example, an individual creates a photograph for private use. Graphical representation portion 806 may also include an audio portion 805 that contains audio clips. For example, the audio clips may contain sound or voice annotation for the photos contained in the photo portion 810.

Video block 812 can be also divided into a news portion 818 and an advertisement portion 820. News portion 818 refers to a motion picture, such as, a section of videotape from a news reporter. Advertisement portion 820 refers to marketing, which may be an interactive commercial advertisement.

Textural representation portion 808 contains an advertisement portion 822 and an information portion 830. While advertisement portion 822 refers to commercial marketing, information portion 830 denotes useful information, such as weather and stock trading news. Advertisement portion 822 is further divided into a standard section 824 and an interactive section 826. Standard section 824 refers to commercial messages using words and text. Interactive section 826 refers to commercial messages using text interactively, such as an on-line purchasing.

Information portion 830 further contains a stock section 832, a news section 834, and a shopping section 836. In one embodiment, stock section 832 refers to stock trading news using text and shopping section 836 refers to on-line shopping using textural representations. News section 834 can be further split into weather channel 838 and news summary channel or headline news 840. Weather channel 838 refers to weather report using text while news summary channel 840 summarizes news. It should be appreciated that any portion of information frame 804 and picture frame 850 can be overlaid to produce a frame that appears as a combination of information and pictures. For example, the picture frame 850 may include a text representation portion 851 and an audio representation portion 852 which may be the same as the audio representation portion 805. As another example, the info portion 830 may also include an image or photo portion which may be the same as the photos portion 810. It should be noted that other categories or portions are possible, but they are not necessary to understanding the present invention.

Figure 9:
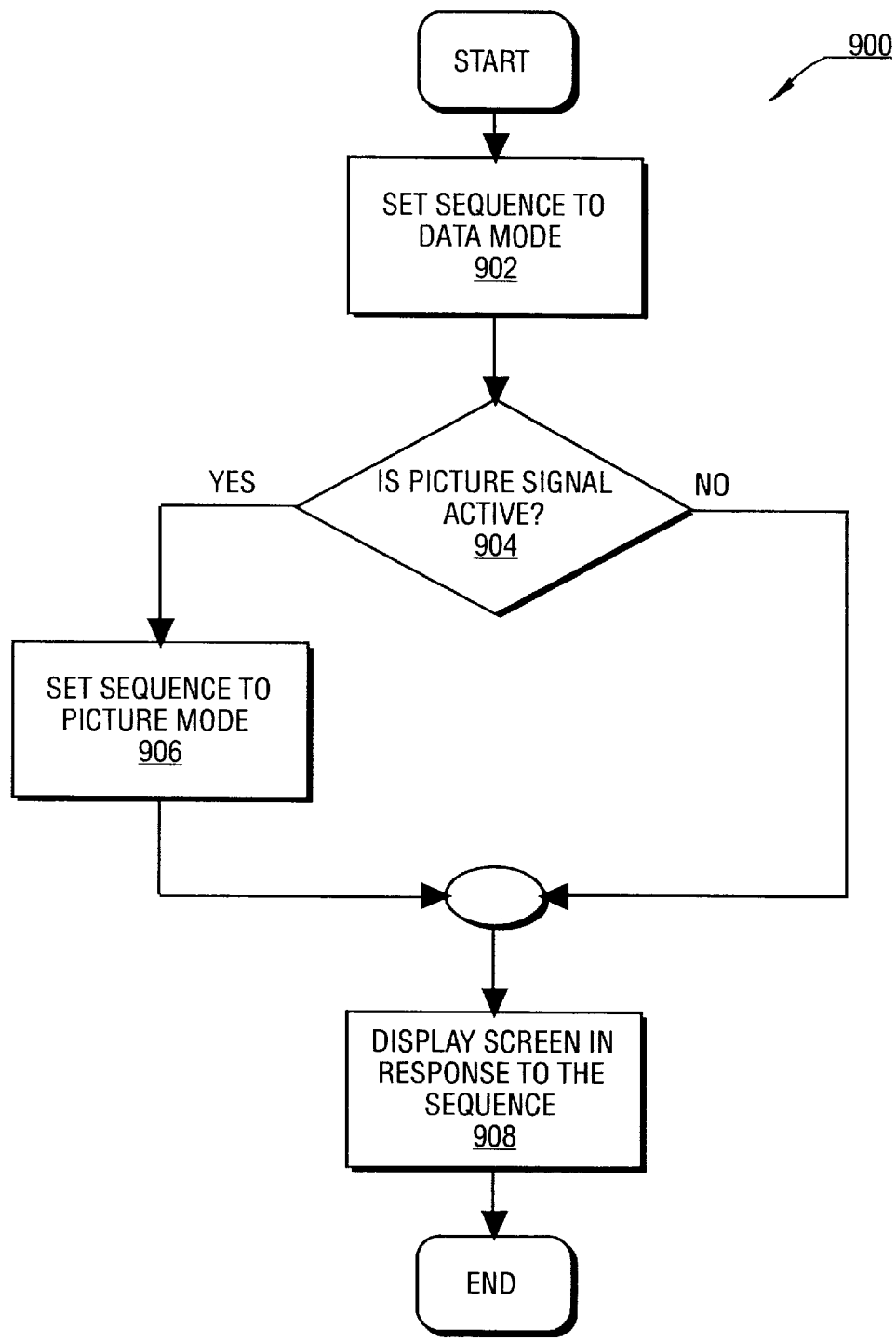
FIG. 9 is a flowchart illustrating an embodiment of multiple modes for displaying images.

FIG. 9 is a flowchart 900 illustrating an embodiment of multiple modes for displaying images. Block 902 shows a step of setting the display sequence to data mode. At block 904, the process determines whether the picture signal is active. If the picture signal is active, which indicates that the picture mode should be set, the picture mode is set at block 906. At block 908, the process displays images according to the display modes. After block 908, the process ends.

Figure 10:
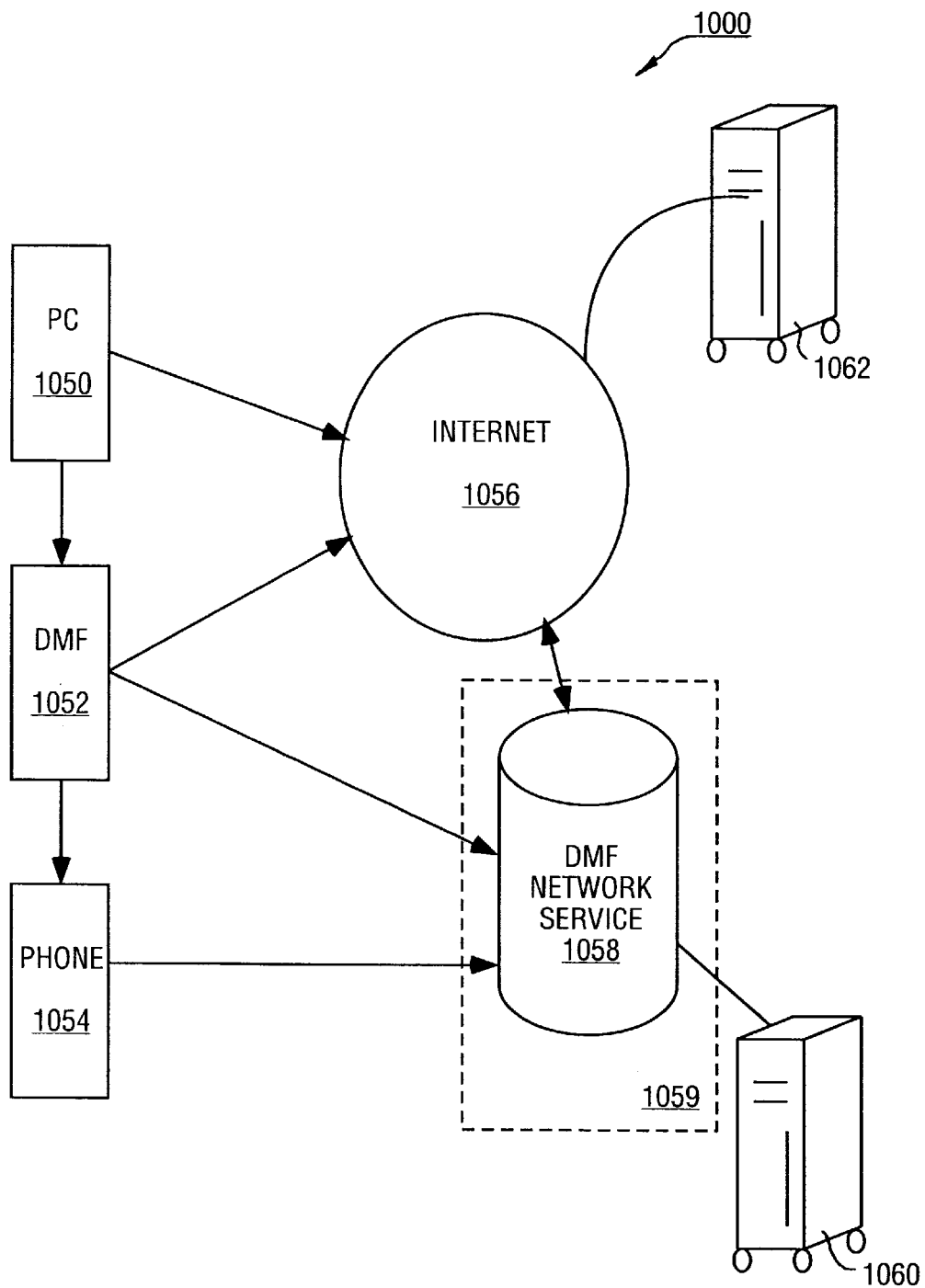
FIG. 10 illustrates an embodiment of multiple mechanisms of accessing DMF network service.

FIG. 10 illustrates an embodiment of a mechanism 1000 showing multiple schemes to access the DMF network service. Mechanism 1000 includes a PC 1050, a DMF 1052, a telephone 1054, a server 1062, and a DMF network server ("DNS") 1059 and all devices are interconnected via the network 1056. The network 1056 may be the Internet or any other network architectures. DNS 1059 supports DMF network service 1058, which provides data implementation. In one embodiment, DMF network service 1058 contains a user profile database, which may be physically located at DNS 1059, server 1060, or server 1062. To access user profiles, a user may use a PC 1050, a DMF 1052 or a telephone 1054 to access the user profile through DMF network service 1058.

In one embodiment, a user may use the telephone 1054 to initiate DMF network service 1058. Once DMF network service 1058 is initiated, it allows the user to use the services, such as reconfiguration of DMF. For example, when DMF 1052 needs to be reconfigured, DMF network services 1058 supplies a DMF web page and allows a user to select options from the DMF web page to configure DMF 1052. It should be noted that communication between DMF 1052 and DMF network service 1058 is carried out through the network 1056.

In another embodiment, a request for DMF network service 1058 from DMF 1052 can be initiated via a direct connection. A direct connection is a cable or a modem that is directly connected between DNS 1059 and DMF 1052. The network 1056 can be an alternative connection between DNS 1059 and DMF 1052.

PC 1050 can also be used to request DMF network service 1058 for DMF 1052. In one embodiment, DMF network service 1058 provides services directly to DMF 1052 after it receives the request. In another embodiment, DMF network service 1058 provides services to DMF 1052 through PC 1050. It should be noted that other methods of requesting DMF network service 1058 are possible, but they are not necessary to understanding the present invention.

Figure 11:
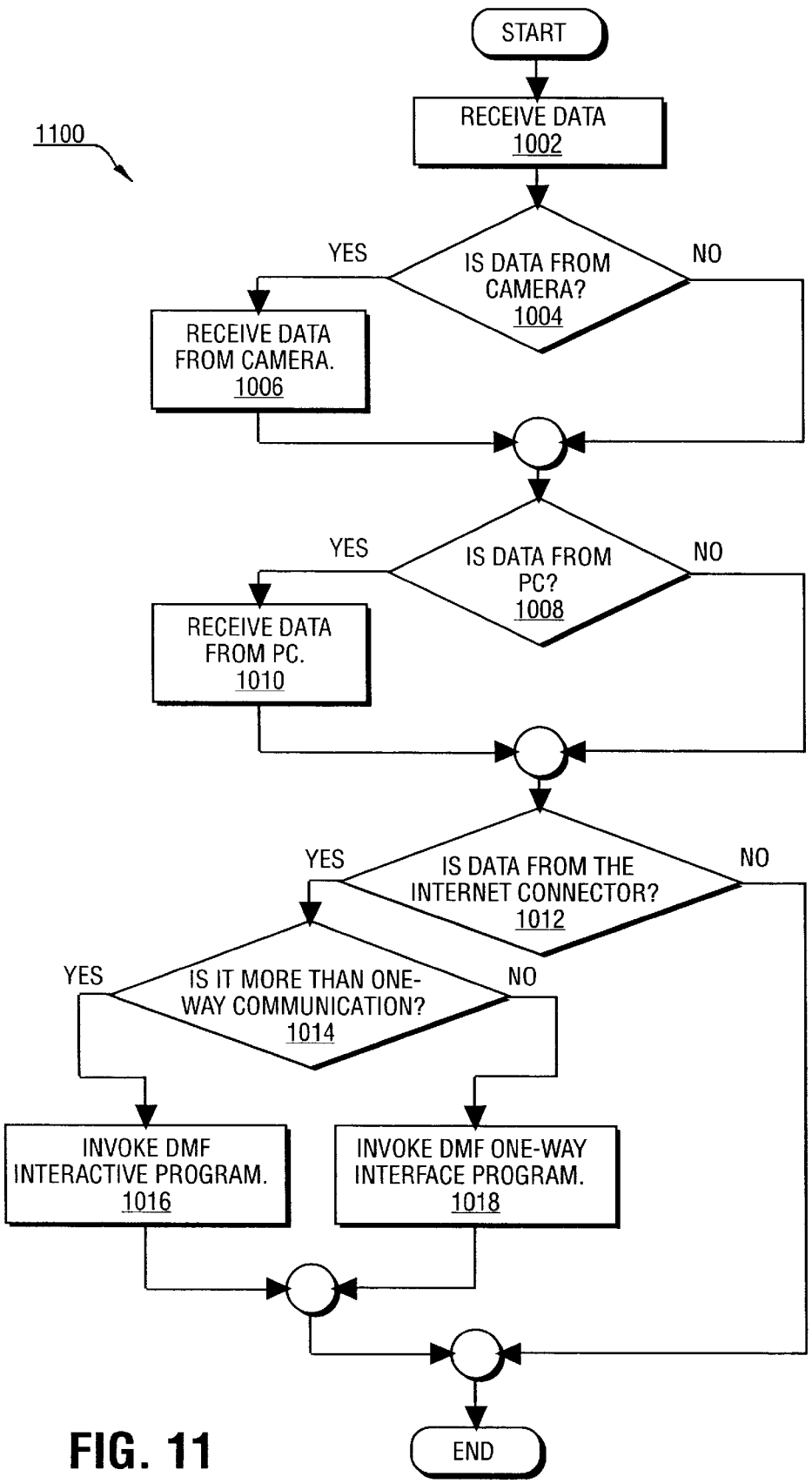
FIG. 11 is a flowchart illustrating an embodiment of receiving data from various devices.

FIG. 11 is a flowchart 1100 illustrating an embodiment of receiving data from various devices. The process begins at the start block and proceeds to block 1002 where the process receives data. At block 1004, the process examines whether the data comes from a camera. If block 1004 is false, the process proceeds to block 1008. However, if the block 1004 is true, which indicates that the data comes from the camera, the process receives the data using camera interface program at block 1006. Camera interface program includes, but not limited to, identifying types of protocol used to transmit the code from the camera and translating the code to native language if it is needed.

At block 1008, the process examines whether the data comes from a PC. If block 1008 is false, the process moves to the block 1012. On the other hand, if block 1008 is true, which indicates that the data comes from the PC, the process moves from block 1008 to block 1010 where the data is received. At block 1012, the process examines whether the data comes from Internet connector. If block 1012 is false, the process loops to the end block where the process ends.

However, if block 1012 is true, which indicates that the data comes from Internet connector, the process proceeds to block 1014 where the process examines whether the communication is a two-way communication. If it is a two-way communication, an interactive communication is possible. If block 1014 is false, which indicates that the communication is a one-way, the process moves to block 1018 where the DMF one-way procedure is invoked to receive the data. For example, some types of paging communication scheme are one-way communication devices and interactive communication is not permitted. After block 1018, the process moves to the end block where the process ends.

On the other hand, if block 1014 is true, which indicates that the communication is a two-way or more than one-way communication, the process moves to block 1016 where the process invokes the DMF two-way interactive program to handle the data. After block 1016, the process moves to the end block where the process ends.

Figure 12:
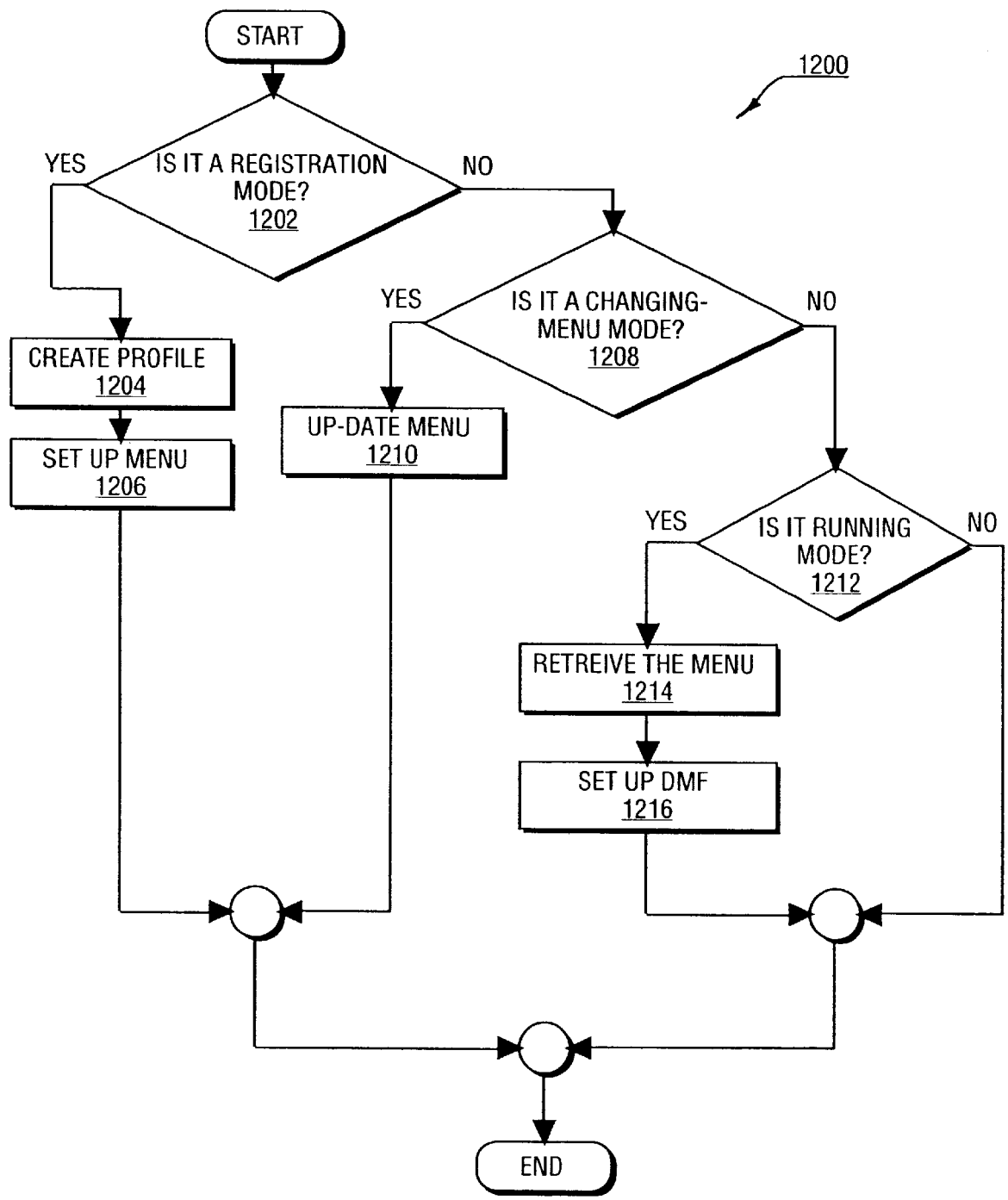
FIG. 12 is a flowchart illustrating an embodiment of different modes for a DMF.

FIG. 12 is a flowchart 1200 illustrating an embodiment of different modes for a DMF. Flowchart 1200 illustrates a registration mode, change menu mode, and running mode. The process begins at the start block and proceeds to block 1202 to examine whether it is a registration mode. If block 1202 is true, which indicates that it is a registration mode, the process proceeds from block 1202 to block 1204 where the process creates a user profile. After block 1204, the process moves to block 1206 where the process sets up the menu and stores the menu to the corresponding user profile.

After block 1206, the process ends. If block 1202 is false, which indicates that it is not a registration mode, the process moves from block 1202 to block 1208. At block 1208, the process examines whether it is a change menu mode. DMF contains a menu, which is used to configure DMF when DMF is used to display information under the information mode. If block 1208 is true, which indicates that it is a change menu mode, the process proceeds to block 1210 where the menu is updated.

If block 1208 is false, the process proceeds to block 1212 and examines whether it is a running mode. During the running mode, DMF fetches the menu from a corresponding user profile and configures the display screen according to the menu. If block 1212 is true, it indicates that it is a running mode, the process proceeds to block 1214. At block 1214, the process retrieves the menu from a corresponding user profile. At block 1216, the information mode of DMF is set up according to the menu. After block 1216, the process ends. If block 1212 is false, the process moves to the end block where the process ends. It should be noted that the flowchart 1200 may contain more than three modes.

Figure 13:
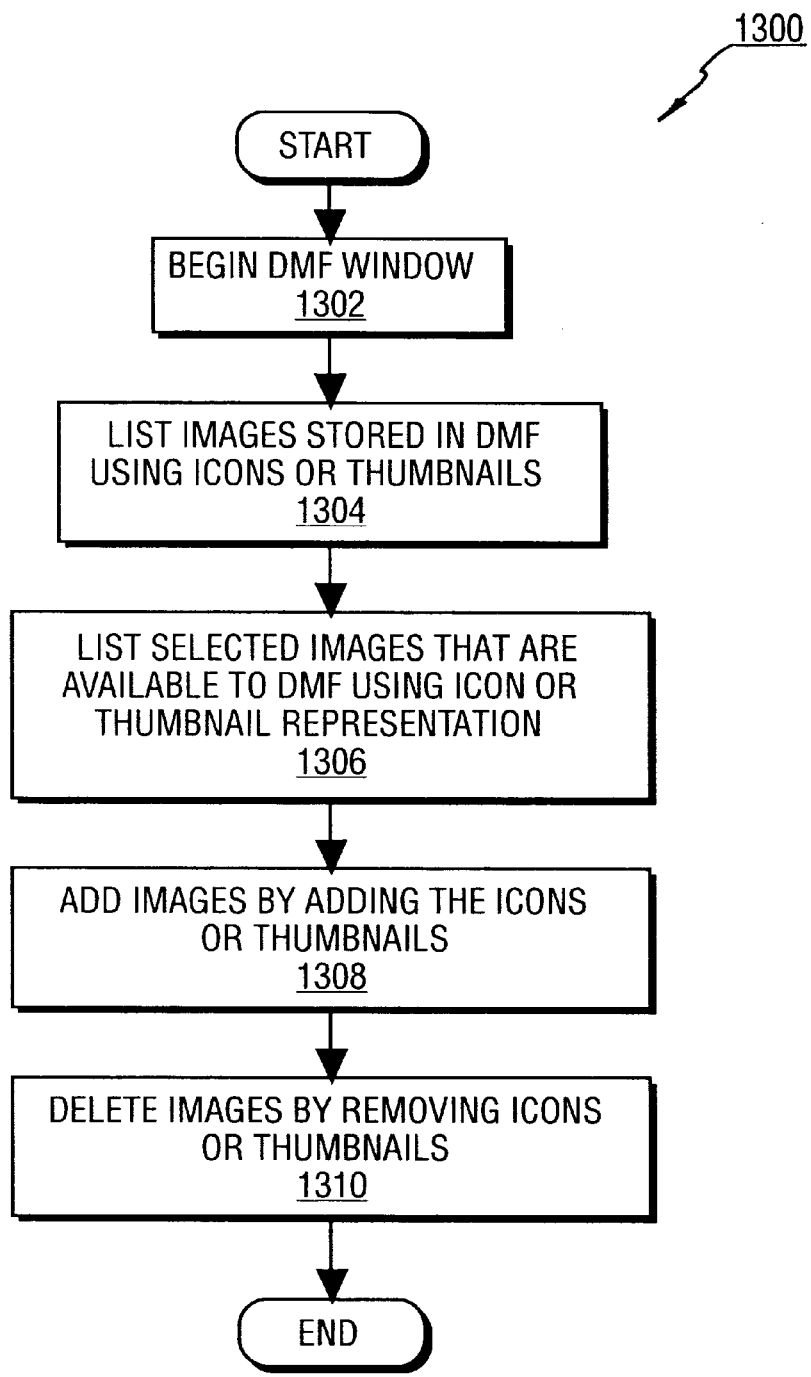
FIG. 13 is a flowchart illustrating an embodiment of DMF window for implementing image data.

FIG. 13 is a flowchart 1300 illustrating an embodiment of DMF window for data implementation. In one embodiment, DMF network service 1058 employs DMF Window to manage the user profile database. The process starts at the start block and proceeds to block 1302. At block 1302, the process begins DMF window. At block 1304, DMF window allocates a portion of screen identified as DMF storage and uses icons or thumbnails to list image files stored in DMF under the DMF storage. Thumbnail is a miniaturized picture that represents the image. At block 1306, DMF window further allocates a second portion of screen identified as global storage where various image files are listed using icons or thumbnails. In one embodiment, image files listed under the global storage are available to DMF.

At block 1308, DMF window allows a user to add an image to DMF by moving the corresponding icon or thumbnail from the global storage (one portion of screen) to the DMF storage (another portion of screen). For example, a user can click an icon and drag the icon from the portion of screen identified as the global storage to the portion of screen identified as the DMF storage. At block 1310, DMF window allows a user to delete an image from DMF by removing the corresponding icon or thumbnail from the DMF storage. For example, a user can click a thumbnail that represents the image to be deleted and drag the thumbnail to the trashcan.

Figure 14:
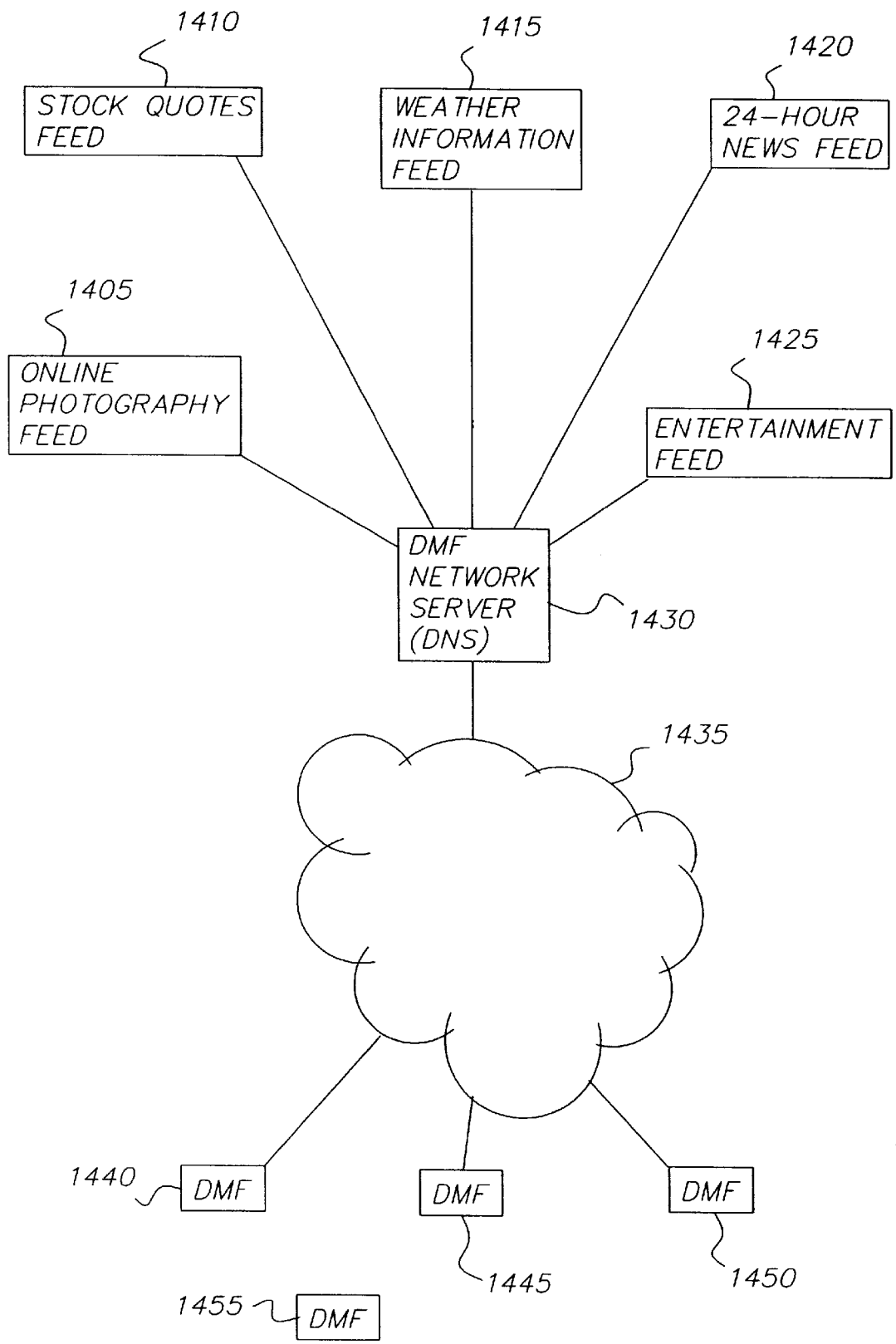
FIG. 14 is an exemplary network diagram illustrating one embodiment of the services available on the DMF network.

FIG. 14 is an exemplary network diagram illustrating one embodiment of the services available on the DMF network. In one embodiment, the DMF 1440, 1445, 1450 or 1455 can access the DMF network 1435 with a dial up connection by connecting the DMF to a telephone line. The DMF network 1435 may be a private proprietary network having its own network infrastructure. The DMF network 1435 may allow connectivity from the Internet. It will be apparent to one skilled in the art that other networks infrastructure such as, for example, wireless networks and cellular networks, may also be used to allow the DMF to connect with the DMF network without departing from the scope of the invention. As discussed previously, the DMF 1455 can operate independently without having to be connected to the DMF network 1435.

In one embodiment, the DMF network 1435 provides the connected DMFs 1440, 1445 and 1450 with information from various online services and content providers, such as, for example, online photography 1405, stock quotes 1410, weather information 1415, news 1420, entertainment 1425, etc. The information may comprise of one or more objects such as, for example, an image, a video, an audio, a text, and etc.

In another embodiment, the format of the information received from the multiple content providers is converted into the native format of the DMFs 1440, 1445, 1450 and 1455. In another embodiment, the DMF network server 1430 may need to reorganize the information received from the content providers and online services so that the information can be displayed on the DMFs 1440, 1445, 1450 and 1455. To receive the information, owners of the DMF may customize the user profile to subscribe to these services. In one embodiment, the DMF owner may make a purchase request for a product connected with the information received by the DMF. For example, the information displayed on the DMF may be a list of objects associated with an on-line catalog, and the DMF owner may purchase one or more objects by selecting them using the control buttons on the DMF. In one embodiment, the DMF network may enable special promotion code to encourage the DMF owner to make the purchase. The DMF owner may also make the same purchase using a PC (not shown) connected with the DMF network. For example, the DMF owner may sign on to the DMF network using a unique user or member identification associated with an account on the DMF network.

Each DMF is uniquely identified in the DMF network. The DMF may be assigned a unique identification when the DMF is manufactured. For example, the unique identification may be a string of ten binary digits stored in a ROM chip in the DMF and is known to the DMF network, or the unique identification may be a serial number of the DMF and is identified to the DMF network by the owner of the DMF. This allows the DMF to be self-authenticated when it communicates with the DMF network server. The unique identification for each DMF may be associated with a unique account in the DMF network. For example, when a new account is set up in the DMF network for a new member who owns a DMF, the serial number of the DMF is specified. This registers the DMF with the DMF network and allows the DMF network to recognize that this particular member also owns a DMF having the particular serial number. Not every member of the DMF network owns a DMF, but every member of the DMF network is assigned a unique account. Each account may be assigned an in-box to receive objects sent by the other members. Each account may also be assigned a storage space to store the objects.

In one embodiment, when the DMF is registered with the DMF network, the DMF owner may need to provide credit card information to be stored with the account. With the credit card information already provided, the DMF owner is not required to provide the credit card information each time a purchase request is made. This helps prevent the credit card information from being intercepted as it is transferred across the DMF network.

Figure 15:
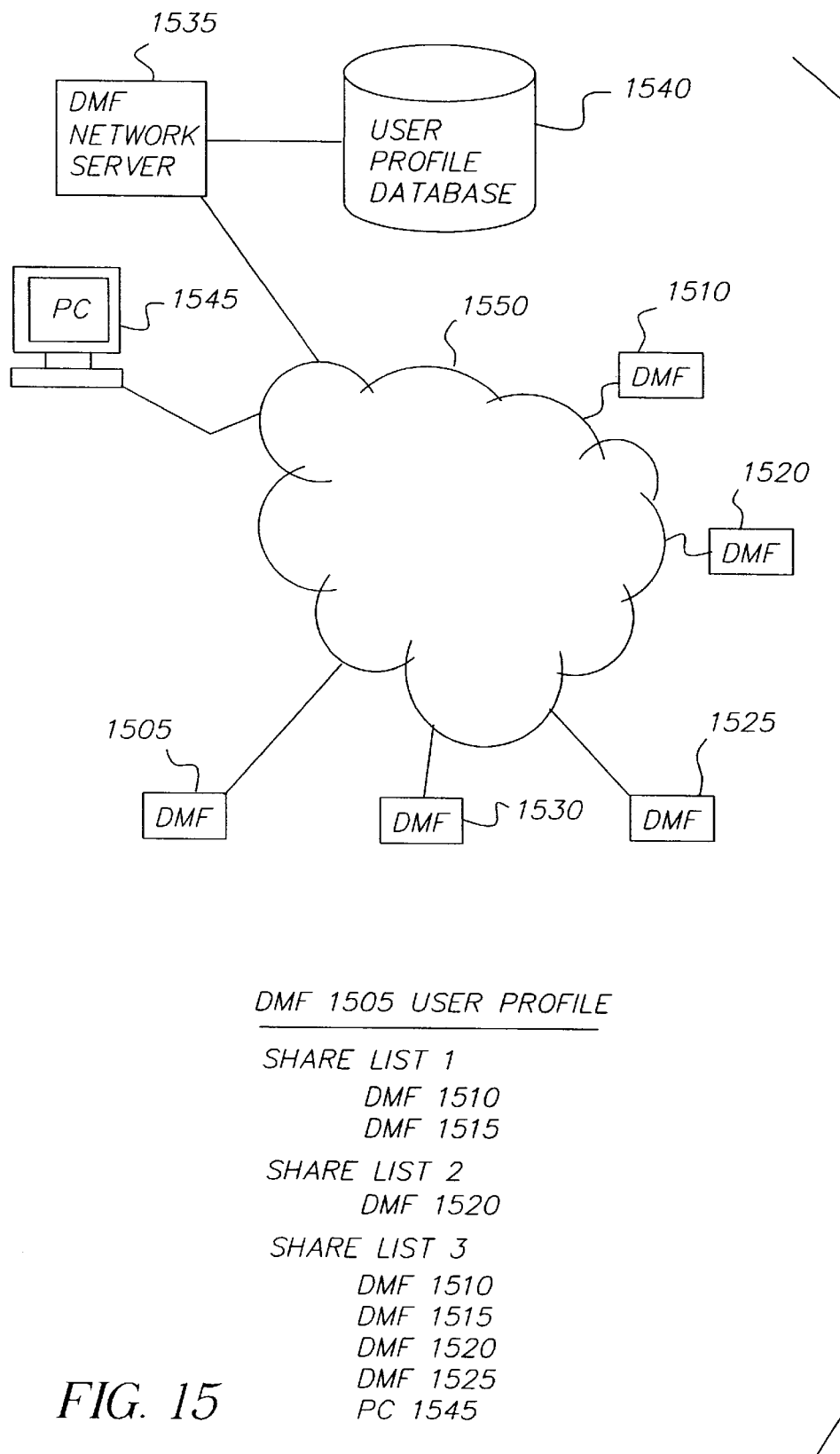
FIG. 15 is an exemplary network diagram illustrating one embodiment of the DMF network and the share function of the DMF.

The information displayed on the DMF can be personalized to reflect what the DMF owner prefers to receive from the DMF network. FIG. 15 is an exemplary network diagram illustrating the DMF network. Each DMF 1505, 1510, 1520, 1525 or 1530 is associated with an account. Each account includes a user profile stored in the user profile database 1540. The user profile contains information specific to the particular DMF. The user profile may include control data or filters to screen the information that the DMF network sends to the DMF 1505, 1510, 1520, 1525 and 1530. The user profile may be updated by signing on to a DMF network service web site using the personal computer (PC) 1545. The DMF network service web site is managed by the DMF network server 1535 which has access to the user profile database 1540.

In one embodiment, the user profile may also contain multiple share groups or share lists. Each share list may include one or more aliases associated with potential recipients that member wants to share the information with. Any member of the DMF network can have a share list regardless whether the member owns a DMF. For example, the user profile associated with the DMF 1505 has three share lists with each share list containing entries referencing the recipients. Each of the entries in the share list may be an identifier (e.g., alias) for a member of the DMF network, an email address for a recipient who is not a member of the DMF network, or a street address for a recipient who does not have an email address. For example, the third share list for the DMF 1505 includes an entry for PC 1545 to indicate an email address for a recipient. Other representations for a recipient may also be used. Each share list may be associated with a share list alias, and the share list alias is sent to the DMF during a synchronization operation between the DMF network and the DMF.

In one embodiment, the DMF is configured to synchronize with the DMF network on a periodic basis. For example, the synchronization takes place whenever at least four hours has elapsed from a previous synchronization. This is because the DMF can operate independently without having to be connected to the DMF network at all times, and the DMF may not have been connected to the DMF network for a long time. In another embodiment, the DMF can be synchronized with the DMF network whenever the DMF is connected to the DMF network or at any time as directed by the DMF owner.

When the synchronization operation takes place, the DMF sends (e.g., upload) to the DMF network all the objects that were loaded into the DMF from the external devices since the previous synchronization. These objects are then stored in the storage space assigned to the account associated with the DMF. The DMF network then sends (e.g., download) to the DMF objects that have been stored in the same storage space but have not been sent to the DMF. These may include objects that were sent to the account by other members of the DMF network after the last synchronization. This process of synchronization may occur with the DMF uploading first or it may occur with the DMF downloading first. The account and the storage space associated with the DMF together may be viewed as an on-line virtual picture frame, and the process of synchronization enables the DMF and its corresponding on-line virtual picture frame to have the same objects.

The share list may be created or edited using the PC 1545 by updating the user profile. The share list may also be created via a telephone by calling an authorized customer service agent with the DMF network. The customer service agent may the update the user profile of the calling member. In one embodiment, the member may select one of the share lists as a default share list. The DMF network then uses the default share list when the member wants to share objects displayed on the DMF. For example, the member may share an object currently displayed on the DMF by activating the share function using a single action. The currently displayed object is automatically shared or distributed to the recipients in the default share list.

Figure 16:
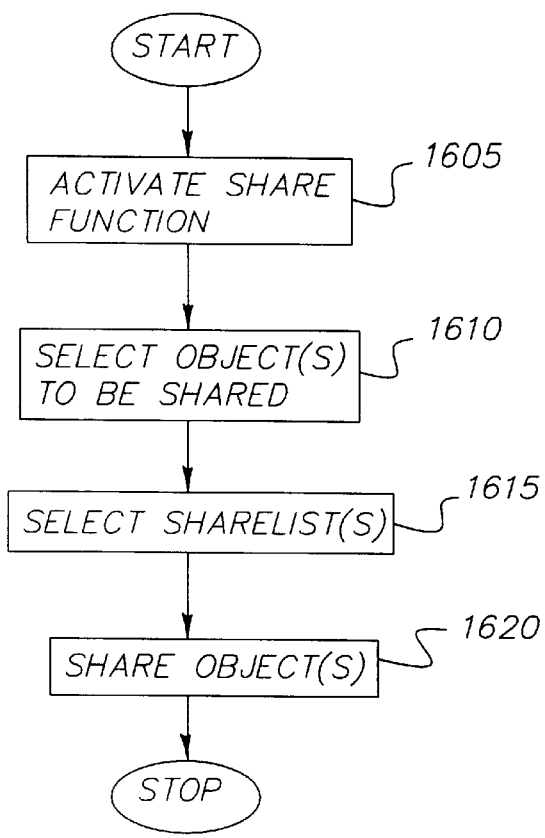
FIG. 16 is an exemplary flow diagram that illustrates an activation of a share operation.

In another embodiment, the user may need to select one or more share lists from the available share lists. FIG. 16 is an exemplary flow diagram that illustrates an activation of a share operation. At block 1605, the member indicates on the DMF that a share operation is to be performed. This may be done by, for example, pressing a share button or any user input mechanism that activates a share logic in the DMF. At block 1610, the DMF displays the available objects in the DMF. The objects may be displayed as thumbnail images on a selection screen. This allows the member (e.g., DMF owner) to select one or more objects to be shared. Selected objects may be displayed with an indicator such as, for example, a check mark or a bold border to distinguish it from the other non-selected objects. When the member completes the selection, the DMF displays the available share lists previously generated by the member. At block 1615, the member may select multiple share lists, in which case the recipients in the multiple share lists receive the selected object(s) to each of the recipients identified in the selected share list(s).

Figure 17:
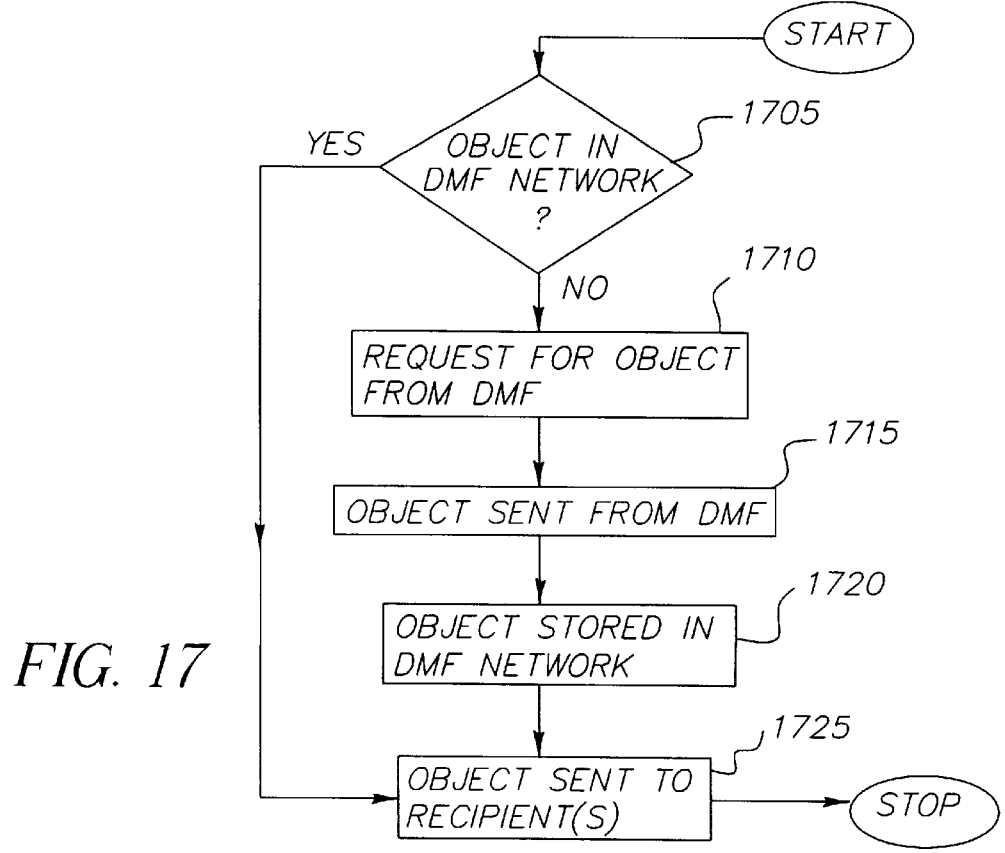
FIG. 17 is an exemplary flow diagram that illustrates the share operation.

FIG. 17 is an exemplary flow diagram illustrating one embodiment the operations performed in block 1620 of FIG. 16. When the DMF network receives the share signals from the DMF, the DMF network server determines whether the object to be shared is already in the network, as shown in block 1705. For example, the network server may search for the object in the storage space associated with the account of the DMF owner in the DMF network. The object may be found in the storage space because it was sent by the DMF during one of the previous synchronization operations. The object may also be found in the storage space because it was sent to the DMF owner by other members of the DMF network. When the object is found in the storage space, the flow goes to block 1725 and the object is distributed to the one or more recipients. However, when the object is not found in the storage space, the DMF network requests the DMF to send the object from the DMF, as shown in block 1710. This occurs when the object was transferred into the DMF from the external device after the last synchronization. At block 1715, the DMF sends the object to the DMF network where the object is stored in the storage space associated with the account of the DMF owner, as shown in block 1720. At block 1725, the object is sent to the recipients.

The DMF owner can share the objects on the DMF with any member of the DMF network including DMF owners and non-DMF owners. The DMF owner can also share the objects on the DMF with any non-members of the DMF network, such as, for example, members of the Zing network at www. Zing.com. Similarly, the non-DMF owner who is a member of the DMF network can share the object in the associated storage space (e.g., virtual frame) with any DMF owners and non-DMF owners, including non-members of the DMF network. This capability allows all potential DMF owners to participate in the DMF network and to take advantages of the DMF network services prior to acquiring the DMFs. The PC 1545 of FIG. 15 may be used by the DMF owners and non-DMF owners to manage the objects in the on-line virtual picture frame from a network browser. When the non-DMF owner acquires the DMF, the serial number of the DMF or the unique identification of the DMF is registered with the DMF network through the existing account of the non-DMF owner.

In one embodiment, when the entry in the share list is a street address (e.g., address of a non-member), the object is sent to the recipient in an appropriate format using the traditional mailing method such as, for example, the U.S. Post Office. For example, a post card may be sent to the recipient when the shared object is an image. When the entry in the share list is an email address (e.g., email address of a non-member), a copy of the object is sent to the recipient using the email address. Alternatively, a link to the DMF network is sent to the recipient using the email address. The recipient may then access the object by selecting the link. For example, when the network is the Internet, a uniform resource locator (URL) for the object is sent to the recipient. When the entry in the share list is an identifier for a member of the DMF network, the object is sent to the in-box for the recipient.

Referring back to FIG. 4, the user input device 410 of the DMF 400 may also include logic or mechanism to allow the DMF owner to activate the share function. The logic or mechanism that implements the share function may be, for example, a button, a toggle switch, etc. Activating this share function enables the DMF owner to be able to share objects with other DMF members and non-DMF members.

Figure 18:
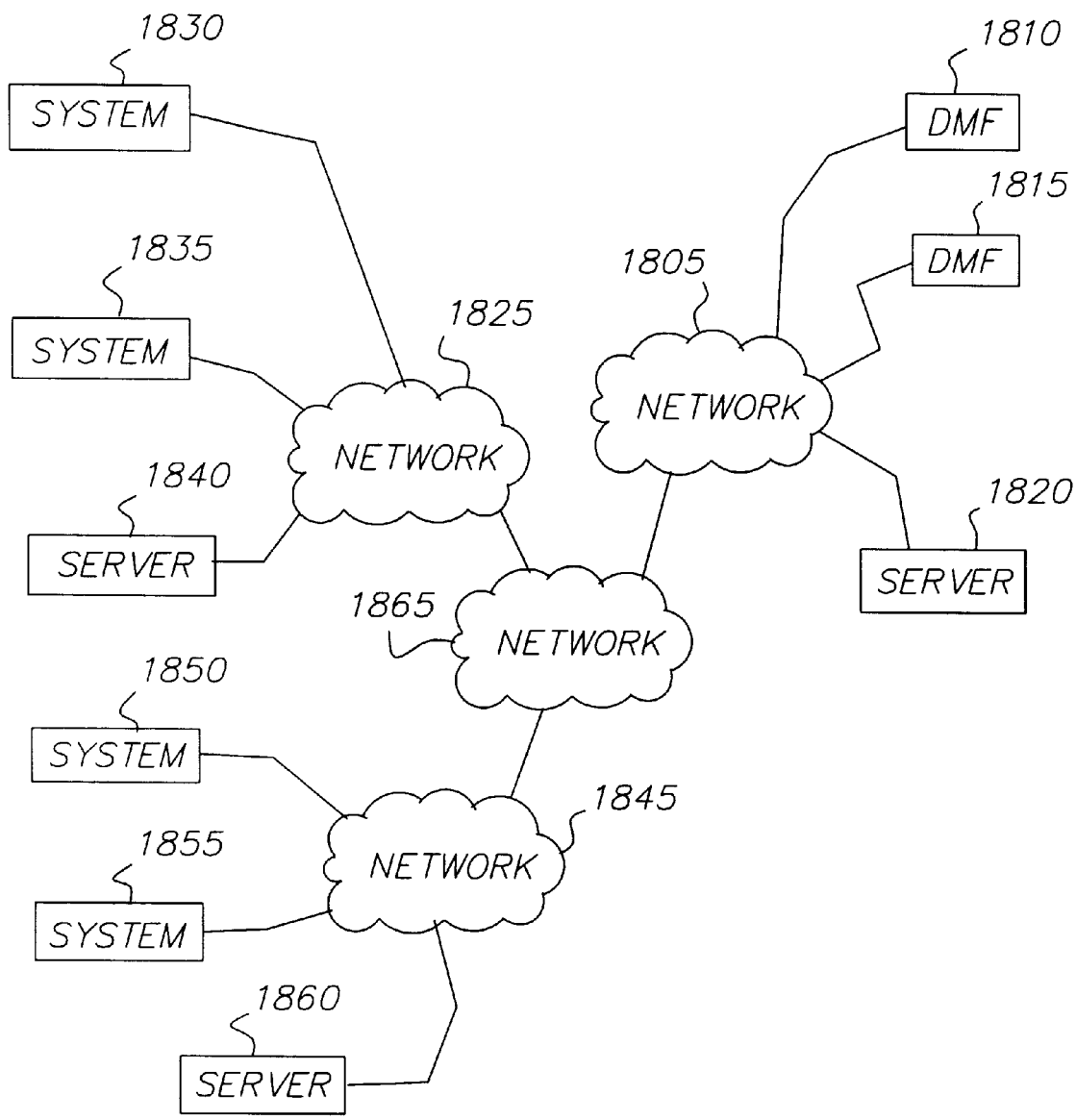
FIG. 18 is an exemplary network diagram illustrating one embodiment of the DMF network interfacing with multiple non-DMF networks.

FIG. 18 is an exemplary network diagram illustrating one embodiment of the DMF network interfacing with multiple non-DMF networks. Each of the networks 1805, 1825 and 1845 represents a community of members served by the network server 1820, 1840 or 1860, respectively. The network 1865 may be a backbone network connecting the networks 1805, 1825 and 1845. The networks 1825 and 1845 represent the non-DMF networks, such as, for example, Yahoo, Amazon, a photo album network, etc. The network 1805 represents the DMF network. The DMFs 1810 and 1815 represent members of the DMF network 1805. As discussed above, the member of the DMF network 1805 may also connect to this network using a PC. The client systems 1830, 1835 represent members of the network 1825, and the client systems 1850, 1855 represent members of the network 1845.

The DMF network 1805 is referred herein as a StoryBox network where a StoryBox refers to a digital media frame (DMF) 1810, 1815. The non-DMF networks 1825 and 1845 are referred herein as partner networks. In one embodiment, a StoryBox network application-programnming interface ("SNAPI") is used to transfer objects such, example, digital images, audio clip, video clip, text, etc., between the StoryBox network 1805 and the partner networks 1825 and 1845. Using SNAPI enables communications between the StoryBox network 1805 and the partner networks 1825, 1845 to be in a consistent format. For example, a request to share an object by the member of the partner network with the members of the StoryBox network has the same format regardless of the identity of the partner network.

In one embodiment, in order for a member of a partner network 1825 to share an object with the members of the StoryBox network 1805, that member needs to be registered with the StoryBox network 1805. This registration enables the member in the partner network 1825 to be uniquely identified in the StoryBox network 1805. The partner network 1825 may make the registration available to its members by displaying a registration window or screen on its network site having an option to allow the member to register with the StoryBox network 1805. For example, the registration may require the member in the partner network 1825 to select a StoryBox user identification and password. This allows the StoryBox network 1805 to establish an account and a user profile for this member. Other information required from this member may include billing address, shipping address, credit card information, etc. Some of this information may have already been stored by the partner network 1825 and thus can be extracted by the partner network 1825 without requiring the member to re-enter the information. When the member owns a DMF, the DMF identification number (e.g., serial number) may also be entered as part of the registration information. In one embodiment, in order to identify a valid partner network, a partner code may be used. The partner code allows the StoryBox network 1805 to filter out unauthorized requests. When the member in the partner network 1825 completes the registration, a notification is sent to the StoryBox network 1805 to indicate intent of registration. The registration information along with the partner code is then sent to the StoryBox network 1805 using SNAPI. The registration information may be encrypted to protect the member's credit card information, billing information, user identification and password, etc.

In one embodiment, the registration information is defined using extensible markup language (XML) and is stored as XML documents. XML is the World Wide Web (WWW) standard for Internet and data exchange. Other data exchanged between the StoryBox network 1805 and the partner network 1825 is also defined using XML. Using XML enables the use of standard tools for manipulating XML documents. The XML documents are sent between the StoryBox network 1805 and the partner network 1825 and are parsed by XML processors. The XML processor reads the data in the XML documents and extracts the registration information so that it can be used to register the member from the partner network 1825 in the StoryBox network 1805.

In another embodiment, when a member in the StoryBox network 1805 is also a member with the partner network 1825, an option is provided to enable the member to link the two accounts together. This option may be provided to the member on the partner network 1825 or on the StoryBox network 1805 or both. With the registration and the link capability from the partner network 1825, the member in the partner network 1825 can request for services from the StoryBox network 1805 without having to leave the partner network 1825. In one embodiment, the partner network 1825 may need to store the StoryBox user identification and password in the partner network 1825 so that processing of requests for services from the StoryBox network 1805 can be done automatically and seamlessly. For example, when the member in the partner network 1825 selects an option to request for a service from the StoryBox network 1805, the request along with the StoryBox user identification and password are sent to the StoryBox network 1805 while the member remains in the partner network 1825.

The StoryBox network 1805 may perform verifications of the registration information sent from the partner network 1825 prior to registering with the StoryBox network 1805. For example, the credit card information may need to be verified to confirm that it is valid, the selected StoryBox user identification may need to be checked to confirm that it has not been selected by another member, the required information was provided by the potential member, etc.

In another embodiment, other options are available to modify an existing registration information and to "unlink" or "unregister" a specific member from the StoryBox network 1805. When modifying the existing registration information, the partner network 1825 may need to send the member user identification, the password, the partner code and the modified information. For example, this option may be used to change the member credit card information, the member billing address, etc. The modification potential conflicts with pending transactions. For example, the member credit card information may not be modified when the member has pending purchase transactions.

The request to "unregister" may be exercised by the member or by a network administrator from the partner network 1825. The request may include the StoryBox user identification and password of the specific member. The request may also include an "unregister" reason code predefined by the StoryBox network 1805. For example, the request may be initiated by the network administrator of the partner network 1825 when the specific member is determined to be using the credit card information from a stolen credit card. In one embodiment, when the "unlink" option is exercised, all pending transactions for the member in the StoryBox network 1805 are stopped. Each StoryBox user identification may be associated with a status code to indicate the status of the respective member. For example, the status code may be "Active" or "Blocked", where "Blocked" indicates no transaction or service can be performed for this member.

When the member in the partner network 1825 is registered with the StoryBox network 1805, the member may share objects with other StoryBox network members without having to leave the partner network 1825. To share an object, the member may need to specify his or her StoryBox user identification and password, a share list and a representation of the object to be share. The representation may be the object or an HTTP address of the object. The share list may be specified by entering the StoryBox user identifications of the recipients. The partner network 1825 may also supply the partner code. The above information is then sent to the StoryBox network 1805 using SNAPI.

Similarly, the member in the partner network 1825 may receive objects sent by members of the StoryBox network 1805. As discussed above, each member of the StoryBox network 1805 is associated with an account, an inbox and a storage space. When an object is shared, a copy of the object is sent to the inbox of each recipient. The member in the partner network 1825 can access the shared object while in the partner network 1825 by selecting an appropriate option such as, for example, "Check SB inbox". The member StoryBox user identification and password along with the partner code are sent to the StoryBox network 1805 using SNAPI. The "Check SB inbox" request is then processed by the StoryBox network 1805. In one embodiment, the StoryBox network 1805 sends thumbnail image representations of the objects received and stored in the member's inbox. The member can then select the desired object by clicking on the thumbnail image. In one embodiment, the StoryBox network 1805 recognizes the object format required by the partner network 1825. The required format may be specified by the partner network 1825 in the XML document sent as a request to the StoryBox network 1805. Alternatively, the required format may have already been set up by a network administrator of the StoryBox network 1805.

As discussed above, the object may also be shared by a member of the StoryBox network 1955 with a recipient who is not a member of the StoryBox network 1805 or the partner network 1825. This recipient may be specified in the share list using an email address, a street address, or any other destination identifiers to enable the recipient to receive the object or a representation of the object. Using SNAPI, other options for services from the StoryBox network 1805 can be made available to the member from the partner network 1805. For example, the member may order reprints of a picture, buy DMFs, buy merchandises associated with the objects, check for status of a pending order, etc.

Data can be sent to the StoryBox network 1805 from various sources. For example, the data may be loaded into the story box (e.g., DMF) 1810, 1815 from a digital camera and then uploaded to the StoryBox network 1805. The data can then be transmitted to partner networks using SNAPI. The data may be received from the partner networks 1825, 1845 as XML documents using SNAPI. The data sent to the StoryBox network 1805 may be in different formats, such as, for example, JPEG (joint Photographic Experts Group) images, PCM (Pulse Code Modulation) digital audio, etc. In one embodiment, when an object (e.g., image, audio, video, text) is sent to the StoryBox network 1805 and received by the StoryBox network server 1820, the StoryBox network server 1820 recognizes the format of the object based on a format information sent in the XML structure. The format of the object may be different from one partner network to another partner network. The StoryBox network server may also recognize the format of the object based on certain characteristics of the object such as, for example, the file extension or attachment type (e.g., MIME). When the StoryBox network server does not recognize the format of the object, a notification may be sent to the sending source to indicate a format incompatibility. When the format of the object is recognized, the StoryBox network server 1820 automatically converts the object into multiple known formats using appropriate format converters (e.g., software adapter). The StoryBox network server 1820 stores the multiple formats in a storage device. This allows the StoryBox network 1805 to process requests from different partner networks 1825, 1845 using the respective format converters. Different representations of the object, such as, for example, lower resolution images and thumbnail images, may also be stored by the StoryBox network server 1820. Furthermore, other formats of the object may also be created to enable faster processing depending on the service (e.g., reprints, printer outputs, etc.) requested.

The storage device may be integrated with the StoryBox network server 1820. Alternatively, the storage device may be a stand-alone device connected to the StoryBox network 1805. The storage device may include a database. This provides the StoryBox network 1805 a flexibility to work with many different client systems from the partner networks 1825, 1845. Since the object is already in the desired format, the retrieval process for the object is faster. It will be apparent to one skilled in the art that other data, such as, for example, textual strings providing descriptions of the image, date and time the object was created, etc., can be exchanged across the StoryBox network 1805 and the partner networks 1825, 1845 using the SNAPI interface.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method for sharing digital images over at least one network comprising the steps of:
   (a) providing a network service over the network;
   (b) permitting at least one share group to access a network server via the network service, the at least one share group including a plurality of members;
   (c) associating a device with each of the plurality of members, each device in communication with the server, the device of one or more members of each of the at least one share group being a continuously operating display, each of the plurality of members of the at least one share group capable of being a sharing member and a receiving member,
   (d) allowing each sharing member to share digital files with the receiving members of the at least one share group by uploading from the device associated with the sharing member at least one digital file to the network service;
   (e) downloading from the network service the at least one digital file to the devices associated with the receiving members of the at least one share group; and
   (f) automatically displaying the at least one digital file on the continuously operating displays associated with the receiving members of the at least one share group.

2. A method as recited in claim 1 wherein:
   the continuously operating display is a digital media frame.

3. A method as recited in claim 1 further comprising the step of:
   storing the digital files on the server.

4. A method as recited in claim 1 wherein:
   the digital files are digital images.

5. A method as recited in claim 4 wherein:
   the digital images include a text portion to be automatically displayed on the continuously operating displays.

6. A method as recited in claim 1 wherein:
   each device includes a non-volatile memory for storing digital image files thereon.

7. A method as recited in claim 1 wherein:
   the device associated with one or more members of the at least one user group is a personal computer.

8. A method as recited in claim 1 further comprising the step of:
   allowing the sharing member to select via the associated device of the sharing member a subset of the members of the at least one user group to receive the uploaded digital files.

9. A method as recited in claim 8 further comprising the step of:
   allowing the sharing member to select via the associated device of the sharing member to select a subset of the uploaded digital files to be shared with the receiving members of the at least one share group.

10. A method as recited in claim 1 wherein:
    each of the devices of the at least one user group are remotely located from one another.

11. A method as recited in claim 1 wherein:
    the network is the Internet.

12. A method as recited in claim 1 further comprising the step of:
    allowing a member of one of the plurality of share groups to also be a member of at least one other share group.

13. A method as recited in claim 1 wherein:
    each continuously operating display includes an interface for receiving digital images directly from a digital camera.

14. A method as recited in claim 1 wherein:
    each continuously operating display includes an interface for receiving digital images directly from a digital camera memory card.

15. A method as recited in claim 1 further comprising the steps of:
    (a) allowing each member to select a customized news transmission from the network service;
    (b) transmitting the customized news transmission from the network service to the device associated with the member, and (c) automatically displaying the customized news transmission on the device associated with the member when the device is the continuously operating display.

16. A method as recited in claim 15 wherein:

the customized news transmission includes financial news, sports news, and/or weather.

17. A method as recited in claim 15 wherein:

the customized news transmission includes advertising.

18. A method as recited in claim 15 wherein:

the customized news transmission includes text.

19. A method as recited in claim 15 wherein:

the customized news transmission is provided from the server.

20. A method as recited in claim 15 further comprising the step of:

connecting the continuously operating display to the network service via a telephone line, a television cable, or the Internet so that the continuously operating display can receive images and data there through.

21. A method as recited in claim 15 wherein:

the customized news transmission includes an audio portion.

22. A method as recited in claim 1 wherein:

providing each device with an identifier for enabling the network service to uniquely identify the device.

23. A method as recited in claim 1 wherein:

each continuously operating display can receive images and data from a plurality of external devices including a digital camera, a video camera, and a computer.

24. A method as recited in claim 23 further comprising the step of:

directly connecting the continuously operating display to one of the plurality of external devices to receive images and data therefrom.

25. A method as recited in claim 1 further comprising the step of:

providing authorization to the network service by an individual to become a member of the at least one share group.

26. A method as recited in claim 25 wherein:

the providing authorization step is performed through the device associated with the member.

27. A method as recited in claim 1 further comprising the step of:

forming a second network of a plurality of the continuously operating displays.

28. A method as recited in claim 1 wherein:

the digital files include an audio portion.

29. A computer storage medium having instructions thereon for causing a computer to perform the method of claim 1.

30. A computer program product comprising a computer readable storage medium having a computer program stored thereon which, when executed by a digital processing system, causes the system to perform a method comprising the steps of:

(a) permitting at least one share group to access a network server via a network service, the at least one share group including a plurality of members;

(b) associating a device with each of the plurality of members, each device in communication with the server, the device of one or more members of each of the at least one share group being a continuously operating display, each of the plurality of members of the at least one share group capable of being a sharing member and a receiving member, (c) allowing each sharing member to share digital files with the receiving members of the at least one share group by uploading from the device associated with the sharing member at least one digital file to the network service;

(d) downloading from the network service the at least one digital file to the devices associated with the receiving members of the at least one share group; and (e) automatically displaying the at least one digital file the continuously operating displays associated with the receiving members of the at least one share group.

* * * * *